(12) United States Patent
Baldwin

(10) Patent No.: US 10,094,288 B2
(45) Date of Patent: Oct. 9, 2018

(54) CERAMIC-TO-METAL TURBINE VOLUTE ATTACHMENT FOR A GAS TURBINE ENGINE

(71) Applicant: ICR Turbine Engine Corporation, Hampton, NH (US)

(72) Inventor: Matthew Stephen Baldwin, Exeter, NH (US)

(73) Assignee: ICR TURBINE ENGINE CORPORATION, Hampton, NH (US)

( * ) Notice: Subject to any disclaimer, the term of this patent is extended or adjusted under 35 U.S.C. 154(b) by 1305 days.

(21) Appl. No.: 13/949,781

(22) Filed: Jul. 24, 2013

(65) Prior Publication Data
US 2014/0026585 A1  Jan. 30, 2014

Related U.S. Application Data

(60) Provisional application No. 61/675,247, filed on Jul. 24, 2012.

(51) Int. Cl.
| | | |
|---|---|---|
| F02C 9/20 | (2006.01) | |
| F02C 7/20 | (2006.01) | |
| F01D 9/02 | (2006.01) | |

(52) U.S. Cl.
CPC ............. *F02C 7/20* (2013.01); *F01D 9/026* (2013.01); *F05D 2300/20* (2013.01)

(58) Field of Classification Search
CPC ......... F02C 7/20; F01D 9/026; F05D 2300/20
(Continued)

(56) References Cited

U.S. PATENT DOCUMENTS

| 2,463,964 A | 3/1949 | Graf |
|---|---|---|
| 2,543,677 A | 2/1951 | Traupel |
| (Continued) | | |

FOREIGN PATENT DOCUMENTS

| AT | 311027 | 12/2005 |
|---|---|---|
| AU | 582981 | 4/1989 |
| (Continued) | | |

OTHER PUBLICATIONS

"A High-Efficiency ICR Microturbine for Commercial Vehicle Propulsion," PACCAR, date unknown, 11 pages.
"Analysis of Technology Options to Reduce the Fuel Consumption of Idling Trucks," Stodolsky, F., L. Gaines, and A. Vyas, Argonne National Laboratory, ANL/ESD-43, Jun. 2000, 40 pages.
(Continued)

*Primary Examiner* — Ted Kim
(74) *Attorney, Agent, or Firm* — Sheridan Ross P.C.

(57) ABSTRACT

A means of attachment applicable to mating parts which have substantially different coefficients of thermal expansion is disclosed. The means of attachment substantially reduces the friction between the mating surfaces while still keeping the mating parts centered with respect to one another. The approach is based on radial recessed faces wherein the radial faces slide relative to each other. There may be three or more recessed/raised faces on each mating component, which when mated, maintain the alignment between the mating parts while allowing differential growth of the mating parts. This approach also the provides a much larger bearing surface for the attachment than a radial pin/slot approach, for example, and substantially eliminates areas of high stress concentration. It is thus a more robust design for components that undergo many thousands of thermal cycles.

9 Claims, 11 Drawing Sheets

(58) Field of Classification Search
USPC .................. 60/799, 800; 415/134, 136
See application file for complete search history.

(56) References Cited

U.S. PATENT DOCUMENTS

| | | | |
|---|---|---|---|
| 2,613,500 A | 10/1952 | Lysholm | |
| 2,696,711 A | 12/1954 | Marchant et al. | |
| 2,711,071 A | 6/1955 | Frankel | |
| 3,032,987 A | 5/1962 | Taylor | |
| 3,091,933 A | 6/1963 | Wagner et al. | |
| 3,166,902 A | 1/1965 | Maljanian et al. | |
| 3,204,406 A | 9/1965 | Howes et al. | |
| 3,209,536 A | 10/1965 | Howes et al. | |
| 3,237,404 A | 3/1966 | Flanigan et al. | |
| 3,283,497 A | 11/1966 | Kaplan | |
| 3,319,931 A | 5/1967 | Bell, III | |
| 3,518,472 A | 6/1970 | O'Callaghan | |
| 3,623,318 A | 11/1971 | Shank | |
| 3,639,076 A | 2/1972 | Rowen | |
| 3,646,753 A | 3/1972 | Stearns et al. | |
| 3,660,977 A | 5/1972 | Reynolds | |
| 3,706,203 A | 12/1972 | Goldberg et al. | |
| 3,729,928 A | 5/1973 | Rowen | |
| 3,742,704 A * | 7/1973 | Adelizzi ............... | F23R 3/60 |
| | | | 431/154 |
| 3,748,491 A | 7/1973 | Barrigher et al. | |
| 3,764,226 A * | 10/1973 | Matto ................... | F01D 25/265 |
| | | | 285/913 |
| 3,764,814 A | 10/1973 | Griffith | |
| 3,765,170 A | 10/1973 | Nakamura | |
| 3,766,732 A | 10/1973 | Woodcock | |
| 3,817,343 A | 6/1974 | Albrecht | |
| 3,824,030 A * | 7/1974 | DeFeo ................. | F01D 11/025 |
| | | | 415/117 |
| 3,831,374 A | 8/1974 | Nicita | |
| 3,848,636 A | 11/1974 | McCombs | |
| 3,866,108 A | 2/1975 | Yannone et al. | |
| 3,888,337 A | 6/1975 | Worthen et al. | |
| 3,893,293 A | 7/1975 | Moore | |
| 3,937,588 A | 2/1976 | Kisslan | |
| 3,939,653 A | 2/1976 | Schirmer | |
| 3,945,199 A | 3/1976 | Bradley et al. | |
| 3,953,967 A | 5/1976 | Smith | |
| 3,964,253 A | 6/1976 | Paduch et al. | |
| 3,977,183 A | 8/1976 | Stearns | |
| 3,986,364 A | 10/1976 | Cronin et al. | |
| 3,986,575 A | 10/1976 | Eggmann | |
| 3,999,373 A | 12/1976 | Bell et al. | |
| 3,999,375 A | 12/1976 | Smith et al. | |
| 4,002,058 A | 1/1977 | Wolfinger | |
| 4,005,946 A | 2/1977 | Brown et al. | |
| 4,027,472 A | 6/1977 | Stearns | |
| 4,027,473 A | 6/1977 | Baker | |
| 4,056,019 A | 11/1977 | Ahlen | |
| 4,059,770 A | 11/1977 | Mackay | |
| 4,067,189 A | 1/1978 | Earnest | |
| 4,082,115 A | 4/1978 | Gibb et al. | |
| 4,122,668 A | 10/1978 | Chou et al. | |
| 4,183,420 A | 1/1980 | Kinoshita | |
| 4,242,042 A | 12/1980 | Schwarz | |
| 4,242,871 A | 1/1981 | Breton | |
| 4,248,040 A | 2/1981 | Kast | |
| 4,253,031 A | 4/1981 | Frister | |
| 4,270,357 A | 6/1981 | Rossi et al. | |
| 4,276,744 A | 7/1981 | Pisano | |
| 4,277,938 A | 7/1981 | Belke et al. | |
| 4,280,327 A | 7/1981 | Mackay | |
| 4,282,948 A | 8/1981 | Jerome | |
| 4,312,191 A | 1/1982 | Biagini | |
| 4,336,856 A | 6/1982 | Gamell | |
| 4,399,651 A | 8/1983 | Geary et al. | |
| 4,411,595 A | 10/1983 | Pisano | |
| 4,449,359 A | 5/1984 | Cole et al. | |
| 4,467,607 A | 8/1984 | Rydquist et al. | |
| 4,470,261 A | 9/1984 | Kronogard et al. | |
| 4,474,007 A | 10/1984 | Kronogard et al. | |
| 4,492,874 A | 1/1985 | Near | |
| 4,494,372 A | 1/1985 | Cronin | |
| 4,499,756 A | 2/1985 | Medeiros et al. | |
| 4,509,333 A | 4/1985 | Nussdorfer et al. | |
| 4,529,887 A | 7/1985 | Johnson | |
| 4,552,386 A * | 11/1985 | Burchette ............ | F16L 23/24 |
| | | | 285/187 |
| 4,586,337 A | 5/1986 | Fox | |
| 4,754,607 A | 7/1988 | Mackay | |
| 4,783,957 A | 11/1988 | Harris | |
| 4,815,278 A | 3/1989 | White | |
| 4,819,436 A | 4/1989 | Ahner et al. | |
| 4,858,428 A | 8/1989 | Paul | |
| 4,864,811 A | 9/1989 | Pfefferle | |
| 5,010,729 A | 4/1991 | Adamson et al. | |
| 5,036,267 A | 7/1991 | Markunas et al. | |
| 5,069,032 A | 12/1991 | White | |
| 5,081,832 A | 1/1992 | Mowill | |
| 5,083,039 A | 1/1992 | Richardson et al. | |
| 5,090,193 A | 2/1992 | Schwarz et al. | |
| 5,097,658 A | 3/1992 | Klaass et al. | |
| 5,113,669 A | 5/1992 | Coffinberry | |
| 5,129,222 A | 7/1992 | Lampe et al. | |
| 5,144,299 A | 9/1992 | Smith | |
| 5,181,827 A | 1/1993 | Pellow et al. | |
| 5,214,910 A | 6/1993 | Adair | |
| 5,231,822 A | 8/1993 | Shekleton | |
| 5,253,470 A | 10/1993 | Newton | |
| 5,276,353 A | 1/1994 | Kobayashi et al. | |
| 5,301,500 A | 4/1994 | Hines | |
| 5,329,757 A | 7/1994 | Faulkner et al. | |
| 5,333,989 A | 8/1994 | Missana et al. | |
| 5,343,692 A | 9/1994 | Thomson et al. | |
| 5,349,814 A | 9/1994 | Ciokajlo et al. | |
| 5,386,688 A | 2/1995 | Nakhamkin | |
| 5,427,455 A | 6/1995 | Bosley | |
| 5,448,889 A | 9/1995 | Bronicki | |
| 5,450,724 A | 9/1995 | Kesseli et al. | |
| 5,488,823 A | 2/1996 | Faulkner et al. | |
| 5,497,615 A | 3/1996 | Noe et al. | |
| 5,529,398 A | 6/1996 | Bosley | |
| 5,549,174 A | 8/1996 | Reis | |
| 5,555,719 A | 9/1996 | Rowen et al. | |
| 5,564,270 A | 10/1996 | Kesseli et al. | |
| 5,586,428 A | 12/1996 | Asai et al. | |
| 5,586,429 A | 12/1996 | Kesseli et al. | |
| 5,609,655 A | 3/1997 | Kesseli et al. | |
| 5,610,962 A | 3/1997 | Solorzano et al. | |
| 5,625,243 A | 4/1997 | Lindgren et al. | |
| 5,667,358 A | 9/1997 | Gaul | |
| 5,685,156 A | 11/1997 | Willis et al. | |
| 5,697,848 A | 12/1997 | Bosley | |
| 5,722,259 A | 3/1998 | Sorensen et al. | |
| 5,742,515 A | 4/1998 | Runkle et al. | |
| 5,752,380 A | 5/1998 | Bosley et al. | |
| 5,784,268 A | 7/1998 | Steffek et al. | |
| 5,791,868 A | 8/1998 | Bosley et al. | |
| 5,819,524 A | 10/1998 | Bosley et al. | |
| 5,820,074 A | 10/1998 | Trommer et al. | |
| 5,827,040 A | 10/1998 | Bosley et al. | |
| 5,850,732 A | 12/1998 | Willis et al. | |
| 5,850,733 A | 12/1998 | Bosley et al. | |
| 5,855,112 A | 1/1999 | Bannai et al. | |
| 5,873,235 A | 2/1999 | Bosley et al. | |
| 5,894,720 A | 4/1999 | Willis et al. | |
| 5,899,673 A | 5/1999 | Bosley et al. | |
| 5,903,116 A | 5/1999 | Geis et al. | |
| 5,915,841 A | 6/1999 | Weissert | |
| 5,918,985 A | 7/1999 | Bosley | |
| 5,928,301 A | 7/1999 | Soga et al. | |
| 5,929,538 A | 7/1999 | O'Sullivan et al. | |
| 5,954,174 A | 9/1999 | Costin | |
| 5,964,663 A | 10/1999 | Stewart et al. | |
| 5,966,926 A | 10/1999 | Shekleton et al. | |
| 5,983,986 A | 11/1999 | Macintyre et al. | |
| 5,983,992 A | 11/1999 | Child et al. | |
| 5,992,139 A | 11/1999 | Kesseli | |
| 6,002,603 A | 12/1999 | Carver | |

(56) References Cited

U.S. PATENT DOCUMENTS

| | | |
|---|---|---|
| 6,011,377 A | 1/2000 | Heglund et al. |
| 6,016,658 A | 1/2000 | Willis et al. |
| 6,020,713 A | 2/2000 | Geis et al. |
| 6,023,135 A | 2/2000 | Gilbreth et al. |
| 6,031,294 A | 2/2000 | Geis et al. |
| 6,037,687 A | 3/2000 | Stewart et al. |
| 6,049,195 A | 4/2000 | Geis et al. |
| 6,062,016 A | 5/2000 | Edelman |
| 6,065,281 A | 5/2000 | Shekleton et al. |
| 6,070,404 A | 6/2000 | Bosley et al. |
| 6,082,112 A | 7/2000 | Shekleton |
| 6,085,524 A | 7/2000 | Persson |
| 6,093,975 A | 7/2000 | Peticolas |
| 6,094,799 A | 8/2000 | Stewart et al. |
| 6,098,397 A | 8/2000 | Glezer et al. |
| 6,107,693 A | 8/2000 | Mongia et al. |
| 6,138,781 A | 10/2000 | Hakala |
| D433,997 S | 11/2000 | Laituri et al. |
| 6,141,953 A | 11/2000 | Mongia et al. |
| 6,155,076 A | 12/2000 | Cullen et al. |
| 6,155,780 A | 12/2000 | Rouse |
| 6,158,892 A | 12/2000 | Stewart et al. |
| 6,169,334 B1 | 1/2001 | Edelman |
| 6,170,251 B1 | 1/2001 | Skowronski et al. |
| 6,178,751 B1 | 1/2001 | Shekleton et al. |
| 6,190,048 B1 | 2/2001 | Weissert |
| 6,192,668 B1 | 2/2001 | Mackay |
| 6,194,794 B1 | 2/2001 | Lampe et al. |
| 6,205,765 B1 | 3/2001 | Iasillo et al. |
| 6,205,768 B1 | 3/2001 | Dibble et al. |
| 6,213,234 B1 | 4/2001 | Rosen et al. |
| 6,239,520 B1 | 5/2001 | Stahl et al. |
| 6,265,786 B1 | 7/2001 | Bosley et al. |
| 6,274,945 B1 | 8/2001 | Gilbreth et al. |
| 6,281,596 B1 | 8/2001 | Gilbreth et al. |
| 6,281,601 B1 | 8/2001 | Edelman et al. |
| 6,305,079 B1 | 10/2001 | Child et al. |
| 6,314,717 B1 | 11/2001 | Teets et al. |
| 6,316,841 B1 | 11/2001 | Weber |
| 6,324,828 B1 | 12/2001 | Willis et al. |
| 6,324,846 B1 | 12/2001 | Clarke |
| 6,325,142 B1 | 12/2001 | Bosley et al. |
| 6,349,787 B1 | 2/2002 | Dakhil |
| 6,355,987 B1 | 3/2002 | Bixel |
| 6,361,271 B1 | 3/2002 | Bosley |
| 6,381,944 B2 | 5/2002 | Mackay |
| 6,405,522 B1 | 6/2002 | Pont et al. |
| 6,410,992 B1 | 6/2002 | Wall et al. |
| 6,425,732 B1 | 7/2002 | Rouse et al. |
| 6,437,468 B2 | 8/2002 | Stahl et al. |
| 6,438,936 B1 | 8/2002 | Ryan |
| 6,438,937 B1 | 8/2002 | Pont et al. |
| 6,453,658 B1 | 9/2002 | Willis et al. |
| 6,468,051 B2 | 10/2002 | Lampe et al. |
| 6,487,096 B1 | 11/2002 | Gilbreth et al. |
| 6,489,692 B1 | 12/2002 | Gilbreth et al. |
| 6,495,929 B2 | 12/2002 | Bosley et al. |
| 6,499,949 B2 | 12/2002 | Schafrik et al. |
| 6,522,030 B1 | 2/2003 | Wall et al. |
| 6,526,757 B2 | 3/2003 | Mackay |
| 6,539,720 B2 | 4/2003 | Rouse et al. |
| 6,542,791 B1 | 4/2003 | Perez |
| 6,543,232 B1 | 4/2003 | Anderson et al. |
| 6,552,440 B2 | 4/2003 | Gilbreth et al. |
| 6,574,950 B2 | 6/2003 | Nash |
| 6,598,400 B2 | 7/2003 | Nash et al. |
| 6,601,392 B2 | 8/2003 | Child |
| 6,605,928 B2 | 8/2003 | Gupta et al. |
| 6,606,864 B2 | 8/2003 | Mackay |
| 6,612,112 B2 | 9/2003 | Gilbreth et al. |
| 6,629,064 B1 | 9/2003 | Wall |
| 6,634,176 B2 | 10/2003 | Rouse et al. |
| 6,638,007 B2 | 10/2003 | Bartholomä et al. |
| 6,639,328 B2 | 10/2003 | Wacknov |
| 6,644,916 B1 | 11/2003 | Beacom |
| RE38,373 E | 12/2003 | Bosley |
| 6,657,332 B2 | 12/2003 | Balas |
| 6,657,348 B2 | 12/2003 | Qin et al. |
| 6,663,044 B1 | 12/2003 | Munoz et al. |
| 6,664,653 B1 | 12/2003 | Edelman |
| 6,664,654 B2 | 12/2003 | Wall et al. |
| 6,670,721 B2 | 12/2003 | Lof et al. |
| 6,675,583 B2 | 1/2004 | Willis et al. |
| 6,683,389 B2 | 1/2004 | Geis |
| 6,684,642 B2 | 2/2004 | Willis et al. |
| 6,698,208 B2 | 3/2004 | Teets |
| 6,698,554 B2 | 3/2004 | Desta et al. |
| 6,702,463 B1 | 3/2004 | Brockett et al. |
| 6,709,243 B1 | 3/2004 | Tan et al. |
| 6,713,892 B2 | 3/2004 | Gilbreth et al. |
| 6,720,685 B2 | 4/2004 | Balas |
| 6,729,141 B2 | 5/2004 | Ingram |
| 6,732,531 B2 | 5/2004 | Dickey |
| 6,735,951 B2 | 5/2004 | Thompson |
| 6,745,574 B1 | 6/2004 | Dettmer |
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,766,647 B2 | 7/2004 | Hartzheim |
| 6,784,565 B2 | 8/2004 | Wall et al. |
| 6,787,933 B2 | 9/2004 | Claude et al. |
| 6,794,766 B2 | 9/2004 | Wickert et al. |
| 6,796,527 B1 | 9/2004 | Munoz et al. |
| 6,804,946 B2 | 10/2004 | Willis et al. |
| 6,810,677 B2 | 11/2004 | Dewis |
| 6,812,586 B2 | 11/2004 | Wacknov et al. |
| 6,812,587 B2 | 11/2004 | Gilbreth et al. |
| 6,815,932 B2 | 11/2004 | Wall |
| 6,817,575 B1 | 11/2004 | Munoz et al. |
| 6,819,999 B2 | 11/2004 | Hartzheim |
| 6,823,675 B2 | 11/2004 | Brunell et al. |
| 6,829,899 B2 | 12/2004 | Benham, Jr. et al. |
| 6,832,470 B2 | 12/2004 | Dewis |
| 6,834,226 B2 | 12/2004 | Hartzheim |
| 6,836,720 B2 | 12/2004 | Hartzheim |
| 6,837,419 B2 | 1/2005 | Ryan |
| 6,845,558 B2 | 1/2005 | Beacom |
| 6,845,621 B2 | 1/2005 | Teets |
| 6,847,129 B2 | 1/2005 | McKelvey et al. |
| 6,847,194 B2 | 1/2005 | Sarlioglu et al. |
| 6,848,249 B2 | 2/2005 | Coleman et al. |
| 6,863,509 B2 | 3/2005 | Dewis |
| 6,864,595 B2 | 3/2005 | Wall |
| 6,870,279 B2 | 3/2005 | Gilbreth et al. |
| 6,877,323 B2 | 4/2005 | Dewis |
| 6,883,331 B2 | 4/2005 | Jonsson et al. |
| 6,888,263 B2 | 5/2005 | Satoh et al. |
| 6,891,282 B2 | 5/2005 | Gupta et al. |
| 6,895,741 B2 | 5/2005 | Rago et al. |
| 6,895,760 B2 | 5/2005 | Kesseli |
| 6,897,578 B1 | 5/2005 | Olsen et al. |
| 6,909,199 B2 | 6/2005 | Gupta et al. |
| 6,911,742 B2 | 6/2005 | Gupta et al. |
| 6,931,856 B2 | 8/2005 | Belokon et al. |
| 6,951,110 B2 | 10/2005 | Kang |
| 6,956,301 B2 | 10/2005 | Gupta et al. |
| 6,958,550 B2 | 10/2005 | Gilbreth et al. |
| 6,960,840 B2 | 11/2005 | Willis et al. |
| 6,964,168 B1 | 11/2005 | Pierson et al. |
| 6,966,173 B2 | 11/2005 | Dewis |
| 6,968,702 B2 | 11/2005 | Child et al. |
| 6,973,880 B2 | 12/2005 | Kumar |
| 6,977,446 B2 | 12/2005 | Mackay |
| 6,979,914 B2 | 12/2005 | McKelvey et al. |
| 6,983,787 B2 | 1/2006 | Schoenenborn |
| 6,989,610 B2 | 1/2006 | Gupta et al. |
| 6,998,728 B2 | 2/2006 | Gupta et al. |
| 7,008,182 B2 * | 3/2006 | Kopp ............... F01D 9/026 415/136 |
| 7,019,626 B1 | 3/2006 | Funk |
| 7,053,590 B2 | 5/2006 | Wang |
| 7,059,385 B2 | 6/2006 | Moilala |
| 7,065,873 B2 | 6/2006 | Kang et al. |
| RE39,190 E | 7/2006 | Weissert |

(56) References Cited

U.S. PATENT DOCUMENTS

| | | |
|---|---|---|
| 7,092,262 B2 | 8/2006 | Ryan et al. |
| 7,093,443 B2 | 8/2006 | McKelvey et al. |
| 7,093,448 B2 | 8/2006 | Nguyen et al. |
| 7,112,036 B2 | 9/2006 | Lubell et al. |
| 7,117,683 B2 | 10/2006 | Thompson |
| 7,147,050 B2 | 12/2006 | Kang et al. |
| 7,166,928 B2 | 1/2007 | Larsen |
| 7,181,337 B2 | 2/2007 | Kosaka |
| 7,185,496 B2 | 3/2007 | Herlihy |
| 7,186,200 B1 | 3/2007 | Hauser |
| 7,211,906 B2 | 5/2007 | Teets et al. |
| 7,224,081 B2 | 5/2007 | Larsen |
| 7,244,524 B2 | 7/2007 | McCluskey et al. |
| 7,266,429 B2 | 9/2007 | Travaly et al. |
| 7,285,871 B2 | 10/2007 | Derouineau |
| 7,299,638 B2 | 11/2007 | Mackay |
| 7,304,445 B2 | 12/2007 | Donnelly |
| 7,309,929 B2 | 12/2007 | Donnelly et al. |
| 7,318,154 B2 | 1/2008 | Tehee |
| 7,325,401 B1 | 2/2008 | Kesseli et al. |
| 7,343,744 B2 | 3/2008 | Abelson et al. |
| 7,393,179 B1 | 7/2008 | Kesseli et al. |
| 7,398,642 B2 | 7/2008 | McQuiggan |
| 7,404,294 B2 | 7/2008 | Sundin |
| 7,415,764 B2 | 8/2008 | Kang et al. |
| 7,423,412 B2 | 9/2008 | Weng et al. |
| 7,464,533 B2 | 12/2008 | Wollenweber |
| 7,513,120 B2 | 4/2009 | Kupratis |
| 7,514,807 B2 | 4/2009 | Donnelly et al. |
| 7,518,254 B2 | 4/2009 | Donnelly et al. |
| RE40,713 E | 5/2009 | Geis et al. |
| 7,554,278 B2 | 6/2009 | Wegner-Donnelly et al. |
| 7,565,867 B2 | 7/2009 | Donnelly et al. |
| 7,572,531 B2 | 8/2009 | Forte |
| 7,574,853 B2 | 8/2009 | Teets et al. |
| 7,574,867 B2 | 8/2009 | Teets et al. |
| 7,595,124 B2 | 9/2009 | Varatharajan et al. |
| 7,605,487 B2 | 10/2009 | Barton et al. |
| 7,605,498 B2 | 10/2009 | Ledenev et al. |
| 7,607,318 B2 | 10/2009 | Lui et al. |
| 7,608,937 B1 | 10/2009 | Altenschulte |
| 7,614,792 B2 | 11/2009 | Wade et al. |
| 7,615,881 B2 | 11/2009 | Halsey et al. |
| 7,617,687 B2 | 11/2009 | West et al. |
| 7,656,135 B2 | 2/2010 | Schram et al. |
| 7,667,347 B2 | 2/2010 | Donnelly et al. |
| 7,671,481 B2 | 3/2010 | Miller et al. |
| 7,766,790 B2 | 8/2010 | Stevenson et al. |
| 7,770,376 B1 | 8/2010 | Brostmeyer |
| 7,777,358 B2 | 8/2010 | Halsey et al. |
| 7,804,184 B2 | 9/2010 | Yuan et al. |
| 7,841,185 B2 | 11/2010 | Richards et al. |
| 7,861,696 B2 | 1/2011 | Lund |
| 7,866,532 B1 | 1/2011 | Potter et al. |
| 7,906,862 B2 | 3/2011 | Donnelly et al. |
| 7,921,944 B2 | 4/2011 | Russell et al. |
| 7,926,274 B2 | 4/2011 | Farkaly |
| 7,944,081 B2 | 5/2011 | Donnelly et al. |
| 7,957,846 B2 | 6/2011 | Hakim et al. |
| 7,966,868 B1 | 6/2011 | Sonnichsen et al. |
| 7,977,845 B1 | 7/2011 | Heitmann |
| 8,008,808 B2 | 8/2011 | Seeker et al. |
| 8,015,812 B1 | 9/2011 | Kesseli et al. |
| 8,046,990 B2 | 11/2011 | Bollinger et al. |
| 8,055,526 B2 | 11/2011 | Blagg et al. |
| 8,188,693 B2 | 5/2012 | Wei et al. |
| 8,215,378 B2 | 7/2012 | Nash et al. |
| 8,244,419 B2 | 8/2012 | Wegner-Donnelly et al. |
| 8,371,365 B2 | 2/2013 | Kesseli et al. |
| 8,499,874 B2 | 8/2013 | Dewis et al. |
| 8,757,964 B2* | 6/2014 | Yamashita .............. F01D 9/026 415/136 |
| 2001/0030425 A1 | 10/2001 | Gilbreth et al. |
| 2001/0052704 A1 | 12/2001 | Bosley et al. |
| 2002/0054718 A1 | 5/2002 | Weissert |
| 2002/0063479 A1 | 5/2002 | Mitchell et al. |
| 2002/0067872 A1 | 6/2002 | Weissert |
| 2002/0073688 A1 | 6/2002 | Bosley et al. |
| 2002/0073713 A1 | 6/2002 | Mackay |
| 2002/0079760 A1 | 6/2002 | Vessa |
| 2002/0083714 A1 | 7/2002 | Bakholdin |
| 2002/0096393 A1 | 7/2002 | Rouse |
| 2002/0096959 A1 | 7/2002 | Qin et al. |
| 2002/0097928 A1 | 7/2002 | Swinton et al. |
| 2002/0099476 A1 | 7/2002 | Hamrin et al. |
| 2002/0103745 A1 | 8/2002 | Lof et al. |
| 2002/0104316 A1 | 8/2002 | Dickey et al. |
| 2002/0110450 A1 | 8/2002 | Swinton |
| 2002/0119040 A1 | 8/2002 | Bosley |
| 2002/0120368 A1 | 8/2002 | Edelman et al. |
| 2002/0124569 A1 | 9/2002 | Treece et al. |
| 2002/0128076 A1 | 9/2002 | Lubell |
| 2002/0148229 A1 | 10/2002 | Pont et al. |
| 2002/0149205 A1 | 10/2002 | Gilbreth et al. |
| 2002/0149206 A1 | 10/2002 | Gilbreth et al. |
| 2002/0157881 A1 | 10/2002 | Bakholdin et al. |
| 2002/0158517 A1 | 10/2002 | Rouse et al. |
| 2002/0166324 A1 | 11/2002 | Willis et al. |
| 2003/0110773 A1 | 6/2003 | Rouse et al. |
| 2004/0008010 A1 | 1/2004 | Ebrahim et al. |
| 2004/0011038 A1 | 1/2004 | Stinger et al. |
| 2004/0035656 A1 | 2/2004 | Anwar et al. |
| 2004/0065293 A1 | 4/2004 | Goto |
| 2004/0080165 A1 | 4/2004 | Geis et al. |
| 2004/0090204 A1 | 5/2004 | McGinley |
| 2004/0103669 A1 | 6/2004 | Willis et al. |
| 2004/0106486 A1 | 6/2004 | Jonsson |
| 2004/0119291 A1 | 6/2004 | Hamrin et al. |
| 2004/0134194 A1 | 7/2004 | Roby et al. |
| 2004/0148942 A1 | 8/2004 | Pont et al. |
| 2004/0160061 A1 | 8/2004 | Rouse et al. |
| 2005/0000224 A1 | 1/2005 | Jonsson |
| 2005/0066921 A1 | 3/2005 | Daigo et al. |
| 2005/0103931 A1 | 5/2005 | Morris et al. |
| 2005/0206331 A1 | 9/2005 | Donnelly |
| 2005/0228553 A1 | 10/2005 | Tryon |
| 2005/0229586 A1 | 10/2005 | Whurr |
| 2006/0021354 A1 | 2/2006 | Mowill |
| 2006/0076171 A1 | 4/2006 | Donnelly et al. |
| 2006/0090109 A1 | 4/2006 | Bonnet |
| 2006/0185367 A1 | 8/2006 | Hino et al. |
| 2006/0248899 A1 | 11/2006 | Borchert |
| 2007/0012129 A1 | 1/2007 | Maty et al. |
| 2007/0068712 A1 | 3/2007 | Carnahan |
| 2007/0178340 A1 | 8/2007 | Eickhoff |
| 2007/0181294 A1 | 8/2007 | Soldner et al. |
| 2007/0239325 A1 | 10/2007 | Regunath |
| 2007/0261681 A1 | 11/2007 | Schoell |
| 2007/0290039 A1 | 12/2007 | Pfleging et al. |
| 2008/0034759 A1 | 2/2008 | Bulman et al. |
| 2008/0080682 A1 | 4/2008 | Ogunwale et al. |
| 2008/0148708 A1 | 6/2008 | Chou et al. |
| 2008/0190117 A1 | 8/2008 | Lee et al. |
| 2008/0197705 A1 | 8/2008 | Dewis et al. |
| 2008/0208393 A1 | 8/2008 | Schricker |
| 2008/0243352 A1 | 10/2008 | Healy |
| 2008/0271703 A1 | 11/2008 | Armstrong et al. |
| 2008/0278000 A1 | 11/2008 | Capp et al. |
| 2009/0045292 A1 | 2/2009 | Maddali et al. |
| 2009/0060725 A1 | 3/2009 | Baron et al. |
| 2009/0071478 A1 | 3/2009 | Kalfon |
| 2009/0090109 A1 | 4/2009 | Mills et al. |
| 2009/0106978 A1 | 4/2009 | Wollenweber |
| 2009/0109022 A1 | 4/2009 | Gangopadhyay et al. |
| 2009/0124451 A1 | 5/2009 | Rask et al. |
| 2009/0133400 A1 | 5/2009 | Callas |
| 2009/0158739 A1 | 6/2009 | Messmer |
| 2009/0193809 A1 | 8/2009 | Schroder et al. |
| 2009/0204316 A1 | 8/2009 | Klampfl et al. |
| 2009/0211260 A1 | 8/2009 | Kesseli et al. |
| 2009/0249786 A1 | 10/2009 | Garrett et al. |
| 2009/0271086 A1 | 10/2009 | Morris et al. |
| 2009/0292436 A1 | 11/2009 | D'Amato et al. |
| 2009/0313990 A1 | 12/2009 | Mustafa |

(56) References Cited

U.S. PATENT DOCUMENTS

| | | | |
|---|---|---|---|
| 2009/0326753 A1 | 12/2009 | Chen et al. | |
| 2010/0021284 A1 | 1/2010 | Watson et al. | |
| 2010/0052425 A1 | 3/2010 | Moore et al. | |
| 2010/0127570 A1 | 5/2010 | Hadar et al. | |
| 2010/0154380 A1 | 6/2010 | Tangirala et al. | |
| 2010/0218750 A1 | 9/2010 | Negre et al. | |
| 2010/0229525 A1 | 9/2010 | Mackay et al. | |
| 2010/0293946 A1 | 11/2010 | Vick | |
| 2010/0301062 A1 | 12/2010 | Litwin et al. | |
| 2010/0319355 A1 | 12/2010 | Prabhu | |
| 2011/0020108 A1 | 1/2011 | Axelsson et al. | |
| 2011/0023491 A1 | 2/2011 | Rendo et al. | |
| 2011/0100777 A1 | 5/2011 | Wilton et al. | |
| 2011/0215640 A1 | 9/2011 | Donnelly | |
| 2011/0288738 A1 | 11/2011 | Donnelly et al. | |
| 2011/0295453 A1 | 12/2011 | Betz et al. | |
| 2012/0000204 A1 | 1/2012 | Kesseli et al. | |
| 2012/0017598 A1 | 1/2012 | Kesseli et al. | |
| 2012/0042656 A1 | 2/2012 | Donnelly et al. | |
| 2012/0096869 A1 | 4/2012 | Kesseli et al. | |
| 2012/0102911 A1 | 5/2012 | Dewis et al. | |
| 2012/0175886 A1 | 7/2012 | Donnelly et al. | |
| 2012/0201657 A1 | 8/2012 | Donnelly et al. | |
| 2012/0260662 A1 | 10/2012 | Nash et al. | |
| 2012/0324903 A1 | 12/2012 | Dewis et al. | |
| 2013/0111923 A1 | 5/2013 | Donnelly et al. | |
| 2013/0133480 A1 | 5/2013 | Donnelly | |
| 2013/0139519 A1 | 6/2013 | Kesseli et al. | |
| 2013/0294892 A1 | 11/2013 | Dewis et al. | |
| 2013/0305730 A1 | 11/2013 | Donnelly et al. | |
| 2014/0000275 A1 | 1/2014 | Kesseli et al. | |
| 2014/0026585 A1* | 1/2014 | Baldwin | F02C 7/20 60/772 |
| 2014/0174083 A1 | 6/2014 | Gerstler et al. | |
| 2014/0196457 A1 | 7/2014 | Kesseli et al. | |
| 2014/0306460 A1 | 10/2014 | Donnelly | |

FOREIGN PATENT DOCUMENTS

| | | |
|---|---|---|
| AU | 587266 | 8/1989 |
| AU | 8517301 | 3/2002 |
| AU | 2025002 | 5/2002 |
| AU | 2589802 | 5/2002 |
| AU | 2004203836 | 3/2005 |
| AU | 2004208656 | 2/2009 |
| AU | 2004318142 | 6/2009 |
| CA | 1050637 | 3/1979 |
| CA | 1068492 | 12/1979 |
| CA | 1098997 | 4/1981 |
| CA | 1099373 | 4/1981 |
| CA | 1133263 | 10/1982 |
| CA | 1171671 | 7/1984 |
| CA | 1190050 | 7/1985 |
| CA | 1202099 | 3/1986 |
| CA | 1244661 | 11/1988 |
| CA | 1275719 | 10/1990 |
| CA | 2066258 | 3/1991 |
| CA | 1286882 | 7/1991 |
| CA | 2220172 | 5/1998 |
| CA | 2234318 | 10/1998 |
| CA | 2238356 | 3/1999 |
| CA | 2242947 | 3/1999 |
| CA | 2246769 | 3/1999 |
| CA | 2279320 | 4/2000 |
| CA | 2677758 | 4/2000 |
| CA | 2317855 | 5/2001 |
| CA | 2254034 | 6/2007 |
| CA | 2638648 | 2/2009 |
| CA | 2689188 | 7/2010 |
| CH | 595552 | 2/1978 |
| CH | 679235 | 1/1992 |
| CN | 1052170 | 6/1991 |
| CN | 1060270 | 4/1992 |
| CN | 1306603 | 8/2001 |
| CN | 1317634 | 10/2001 |
| CN | 1902389 | 1/2007 |
| CN | 101098079 | 1/2008 |
| CN | 100564811 | 12/2009 |
| CN | 101635449 | 1/2010 |
| CN | 101672252 | 3/2010 |
| CS | 9101996 | 1/1992 |
| CZ | 20014556 | 4/2003 |
| DE | 1272306 | 7/1968 |
| DE | 2753673 | 6/1978 |
| DE | 2853919 | 6/1979 |
| DE | 3140694 | 7/1982 |
| DE | 3736984 | 5/1988 |
| DE | 69519684 | 8/2001 |
| DE | 10305352 | 9/2004 |
| DE | 69828916 | 3/2006 |
| DE | 60125441 | 2/2007 |
| DE | 60125583 | 2/2007 |
| DK | 331889 | 7/1989 |
| EP | 0092551 | 11/1983 |
| EP | 0093118 | 11/1983 |
| EP | 0104921 | 4/1984 |
| EP | 0157794 | 10/1985 |
| EP | 0377292 | 7/1990 |
| EP | 0319246 | 10/1990 |
| EP | 0432753 | 6/1991 |
| EP | 0455640 | 11/1991 |
| EP | 0472294 | 2/1992 |
| EP | 0478713 | 4/1992 |
| EP | 0493481 | 7/1992 |
| EP | 0522832 | 1/1993 |
| EP | 0620906 | 10/1994 |
| EP | 0691511 | 1/1996 |
| EP | 0754142 | 1/1997 |
| EP | 0784156 | 12/1997 |
| EP | 0837224 | 4/1998 |
| EP | 0837231 | 4/1998 |
| EP | 0901218 | 3/1999 |
| EP | 0698178 | 6/1999 |
| EP | 0963035 | 12/1999 |
| EP | 1055809 | 11/2000 |
| EP | 1075724 | 2/2001 |
| EP | 1046786 | 1/2002 |
| EP | 1071185 | 1/2002 |
| EP | 1215393 | 6/2002 |
| EP | 0739087 | 8/2002 |
| EP | 1240713 | 9/2002 |
| EP | 1277267 | 1/2003 |
| EP | 1283166 | 2/2003 |
| EP | 1305210 | 5/2003 |
| EP | 1340301 | 9/2003 |
| EP | 1340304 | 9/2003 |
| EP | 1341990 | 9/2003 |
| EP | 1342044 | 9/2003 |
| EP | 1346139 | 9/2003 |
| EP | 1436504 | 7/2004 |
| EP | 1203866 | 8/2004 |
| EP | 0800616 | 12/2004 |
| EP | 1519011 | 3/2005 |
| EP | 1132614 | 1/2007 |
| EP | 1790568 | 5/2007 |
| EP | 1813807 | 8/2007 |
| EP | 1825115 | 8/2007 |
| EP | 1860750 | 11/2007 |
| EP | 1939396 | 7/2008 |
| EP | 2028104 | 2/2009 |
| EP | 1638184 | 3/2009 |
| EP | 1648096 | 7/2009 |
| EP | 2108828 | 10/2009 |
| EP | 1728990 | 11/2009 |
| EP | 2161444 | 3/2010 |
| EP | 2169800 | 3/2010 |
| EP | 1713141 | 5/2010 |
| EP | 1728304 | 6/2010 |
| EP | 1468180 | 7/2010 |
| FR | 2467286 | 11/1985 |
| FR | 2637942 | 4/1990 |
| FR | 2645908 | 10/1990 |
| FR | 2755319 | 4/1998 |

(56) References Cited

FOREIGN PATENT DOCUMENTS

| | | |
|---|---|---|
| FR | 2848647 | 6/2004 |
| GB | 612817 | 11/1948 |
| GB | 671379 | 5/1952 |
| GB | 673961 | 6/1952 |
| GB | 706743 | 4/1954 |
| GB | 731735 | 6/1955 |
| GB | 761955 | 11/1956 |
| GB | 768047 | 2/1957 |
| GB | 784119 | 10/1957 |
| GB | 786001 | 11/1957 |
| GB | 789589 | 1/1958 |
| GB | 807267 | 1/1959 |
| GB | 817507 | 7/1959 |
| GB | 834550 | 5/1960 |
| GB | 864712 | 4/1961 |
| GB | 874251 | 8/1961 |
| GB | 877838 | 9/1961 |
| GB | 878552 | 10/1961 |
| GB | 885184 | 12/1961 |
| GB | 917392 | 2/1963 |
| GB | 919540 | 2/1963 |
| GB | 920408 | 3/1963 |
| GB | 924078 | 4/1963 |
| GB | 931926 | 7/1963 |
| GB | 937278 | 9/1963 |
| GB | 937681 | 9/1963 |
| GB | 950015 | 2/1964 |
| GB | 950506 | 2/1964 |
| GB | 977402 | 12/1964 |
| GB | 993039 | 5/1965 |
| GB | 1004953 | 9/1965 |
| GB | 1008310 | 10/1965 |
| GB | 1009115 | 11/1965 |
| GB | 1012909 | 12/1965 |
| GB | 1043271 | 9/1966 |
| GB | 1083943 | 9/1967 |
| GB | 1097623 | 1/1968 |
| GB | 1103032 | 2/1968 |
| GB | 1127856 | 9/1968 |
| GB | 1137691 | 12/1968 |
| GB | 1138807 | 1/1969 |
| GB | 1141019 | 1/1969 |
| GB | 1148179 | 4/1969 |
| GB | 1158271 | 7/1969 |
| GB | 1172126 | 11/1969 |
| GB | 1174207 | 12/1969 |
| GB | 1211607 | 11/1970 |
| GB | 1270011 | 4/1972 |
| GB | 1275753 | 5/1972 |
| GB | 1275754 | 5/1972 |
| GB | 1275755 | 5/1972 |
| GB | 1301104 | 12/1972 |
| GB | 1348797 | 3/1974 |
| GB | 1392271 | 4/1975 |
| GB | 1454766 | 11/1976 |
| GB | 1460590 | 1/1977 |
| GB | 1516664 | 7/1978 |
| GB | 2019494 | 10/1979 |
| GB | 2074254 | 10/1981 |
| GB | 2089433 | 6/1982 |
| GB | 2123154 | 1/1984 |
| GB | 2174824 | 11/1986 |
| GB | 2184609 | 6/1987 |
| GB | 2199083 | 6/1988 |
| GB | 2211285 | 6/1989 |
| GB | 2218255 | 11/1989 |
| GB | 2232207 | 12/1990 |
| GB | 2341897 | 3/2000 |
| GB | 2355286 | 4/2001 |
| GB | 2420615 | 5/2006 |
| GB | 2426043 | 11/2006 |
| GB | 2435529 | 8/2007 |
| GB | 2436708 | 10/2007 |
| GB | 2441924 | 3/2008 |
| GB | 2442585 | 4/2008 |
| GB | 2456336 | 7/2009 |
| GB | 2456672 | 7/2009 |
| GB | 2447514 | 12/2009 |
| IN | 4946DELNP2006 | 8/2007 |
| IN | 4341DELNP2005 | 10/2007 |
| IN | 5879DELNP2008 | 9/2008 |
| IN | 2502DEL2005 | 10/2009 |
| IN | 1913DEL2009 | 6/2010 |
| IN | 55DEL2010 | 7/2010 |
| IN | 2013DEL2009 | 7/2010 |
| IT | 1173399 | 6/1987 |
| IT | 1194590 | 9/1988 |
| IT | MI911564 | 1/1992 |
| JP | 51-065252 | 6/1976 |
| JP | 56-088920 | 7/1981 |
| JP | 56-148624 | 11/1981 |
| JP | 56-148625 | 11/1981 |
| JP | S59-010709 | 1/1984 |
| JP | 60-184973 | 9/1985 |
| JP | S60-184906 | 9/1985 |
| JP | 61-182489 | 8/1986 |
| JP | 3182638 | 8/1991 |
| JP | 6201891 | 7/1994 |
| JP | 2519620 | 7/1996 |
| JP | 10-054561 | 2/1998 |
| JP | 10-061660 | 3/1998 |
| JP | 10-115229 | 5/1998 |
| JP | 10-122180 | 5/1998 |
| JP | 11-324727 | 11/1999 |
| JP | 2000-054855 | 2/2000 |
| JP | 2000-130319 | 5/2000 |
| JP | 2000-329096 | 11/2000 |
| JP | 2002-030942 | 1/2002 |
| JP | 2002-115565 | 4/2002 |
| JP | 2003-009593 | 1/2003 |
| JP | 2003-013744 | 1/2003 |
| JP | 2003-041906 | 2/2003 |
| JP | 2004-163087 | 6/2004 |
| JP | 2005-345095 | 12/2005 |
| JP | 2006-022811 | 1/2006 |
| JP | 2006-170208 | 6/2006 |
| JP | 2006-174694 | 6/2006 |
| JP | 2006-200438 | 8/2006 |
| JP | 2007-231949 | 9/2007 |
| JP | 2008-111438 | 5/2008 |
| JP | 2008-132973 | 6/2008 |
| JP | 2009-108756 | 5/2009 |
| JP | 2009-108860 | 5/2009 |
| JP | 2009-209931 | 9/2009 |
| JP | 2009-216085 | 9/2009 |
| JP | 2009-250040 | 10/2009 |
| JP | 2010-014114 | 1/2010 |
| JP | 2010-106835 | 5/2010 |
| KR | 19840002483 | 12/1984 |
| KR | 880002362 | 10/1988 |
| KR | 890001170 | 4/1989 |
| KR | 1020010007189 | 1/2001 |
| KR | 1020020024545 | 3/2002 |
| KR | 1020030032864 | 4/2003 |
| KR | 1020060096320 | 9/2006 |
| KR | 1020070078978 | 8/2007 |
| KR | 1020070113990 | 11/2007 |
| KR | 1020080033866 | 4/2008 |
| KR | 1020090121248 | 11/2009 |
| NL | 7903120 | 10/1979 |
| SE | 437543 | 3/1985 |
| SE | 9901718 | 5/1999 |
| SE | 0103180 | 3/2003 |
| WO | WO 8501326 | 3/1985 |
| WO | WO 9207221 | 4/1992 |
| WO | WO 9524072 | 9/1995 |
| WO | WO 9722176 | 6/1997 |
| WO | WO 9722789 | 6/1997 |
| WO | WO 9726491 | 7/1997 |
| WO | WO 9825014 | 6/1998 |

(56) References Cited

FOREIGN PATENT DOCUMENTS

| | | |
|---|---|---|
| WO | WO 9854448 | 12/1998 |
| WO | WO 9919161 | 4/1999 |
| WO | WO 0140644 | 6/2001 |
| WO | WO 0182448 | 11/2001 |
| WO | WO 0202920 | 1/2002 |
| WO | WO 0240844 | 5/2002 |
| WO | WO 0242611 | 5/2002 |
| WO | WO 0244574 | 6/2002 |
| WO | WO 0250618 | 6/2002 |
| WO | WO 0237638 | 9/2002 |
| WO | WO 0229225 | 2/2003 |
| WO | WO 0239045 | 2/2003 |
| WO | WO 03093652 | 6/2004 |
| WO | WO 2004077637 | 9/2004 |
| WO | WO 2005045345 | 5/2005 |
| WO | WO 2005099063 | 10/2005 |
| WO | WO 2008044972 | 4/2008 |
| WO | WO 2008044973 | 4/2008 |
| WO | WO 2008082334 | 7/2008 |
| WO | WO 2008082335 | 7/2008 |
| WO | WO 2008082336 | 7/2008 |
| WO | WO 2009067048 | 5/2009 |
| WO | WO 2010050856 | 5/2010 |
| WO | WO 2010082893 | 7/2010 |
| ZA | 8608745 | 7/1987 |

OTHER PUBLICATIONS

"Benefits of the Microturbine to Power the Next Generation of Trucks." Kenworth Truck Company, date unknown, 9 pages.

"Why Gas Turbines have a Future in Heavy Duty Trucks." Capstone Turbine Corporation, Brayton Energy, LLC, Kenworth Truck Company, a PACCAR Company, Peterbilt Truck Company, a PACCAR Company, Apr. 2009, 10 pages.

Balogh et al. "DC Link Floating for Grid Connected PV Converters," World Academy of Science, Engineering and Technology Apr. 2008, Iss. 40, pp. 115-120.

Mackay et al. "High Efficiency Vehicular Gas Turbines," SAE International, 2005, 10 pages.

Nemeth et al. "Life Predicted in a Probabilistic Design Space for Brittle Materials With Transient Loads," NASA, last updated Jul. 21, 2005, found at http://www.grc.nasa.gov/WWW/RT/2004/RS/RS06L-nemeth.html, 5 pages.

Wolf et al. "Preliminary Design and Projected Performance for Intercooled-Recuperated Microturbine," Proceedings of the ASME TurboExpo 2008 Microturbine and Small Turbomachinery Systems, Jun. 9-13, 2008, Berlin, Germany, 10 pages.

"Remy HVH250-090-SOM Electric Motor," Remy International, Inc., 2011, 2 pages.

Gieras et al., "Performance Calculation for a High-Speed Solid-Rotor Induction Motor," IEEE Transactions on Industrial Electronics, 2012, vol. 59, No. 6, pp. 2689-2700.

* cited by examiner

US 10,094,288 B2

CERAMIC-TO-METAL TURBINE VOLUTE ATTACHMENT FOR A GAS TURBINE ENGINE

CROSS REFERENCE TO RELATED APPLICATION

The present application claims the benefits, under 35 U.S.C. § 119(e), of U.S. Provisional Application Ser. No. 61/675,247 entitled "Ceramic-to-Metal Turbine Volute Attachment for a Gas Turbine Engine" filed Jul. 24, 2012 which is incorporated herein by reference.

FIELD

The present invention relates generally to a ceramic-to-metal turbine volute and shroud assembly attachment compatible with thermal cycling of a gas turbine engine.

BACKGROUND

The world requires ever-increasing amounts of fuel for vehicle propulsion. Means of utilizing fuels more efficiently and with substantially lower carbon dioxide emissions and air pollutants such as NOxs are essential. Vehicles powered by gas turbines can utilize multiple fuels since they are highly fuel flexible and fuel tolerant. In addition, gas turbine engines, because of their lower average operating temperatures compared to piston-based internal combustion engines, can reduce fuel consumption while also reducing carbon dioxide emissions and air pollutants such as NOxs.

The thermal efficiency of gas turbine engines has been steadily improving as the use of new materials and new design tools are being brought to bear on engine design. One of the important advances has been the use of ceramics in various gas turbine engine components which has allowed the use of higher temperature operation and reduced component weight. The efficiency of gas turbine engines can be improved and engine size can be further reduced by increasing the pressure and temperature developed in the combustor while still remaining well below the temperature threshold of significant NOx production. This can be done using a conventional metallic combustor or a thermal reactor to extract energy from the fuel. As combustor temperature and pressure are raised, new requirements are generated in other components, such as the recuperator and compressor-turbine spools.

The use of both metallic and ceramic components in an engine which may have wide variations in operating temperatures, means that special attention be given to the interfaces of the these different materials to preserve the intended component clearances. Control of clearances generally leads to fewer parasitic performance losses. Fewer parasitic performance losses incrementally improves engine efficiency. In addition, the differential expansion of metallic and ceramic components over many thermal cycles can lead to increased wear and degradation of component clearances which, in turn, can result in ceramic component failure either from increasing thermal stresses, crack growth or contact between moving parts.

There remains a need for innovative designs for gas turbine compressor/turbine spools fabricated from a combination of metallic and ceramic materials that maintain a desired control of clearances between various compressor and turbine components. These new designs will allow increased combustor temperatures which, in turn, can improve overall engine efficiency and reduce engine size while maintaining very low levels of NOx production.

SUMMARY

These and other needs are addressed by the various embodiments and configurations of the present disclosure which are directed generally to a gas turbine spool design combining metallic and ceramic components in a way that controls clearances and maintains concentricity in the presence of relative motion between critical components over a range of operating temperatures and pressures.

In a high efficiency gas turbine engine, the turbine adjacent to the combustor may have a ceramic rotor and metallic volute and rotor shroud, a ceramic rotor and volute and metallic rotor shroud, a ceramic rotor and rotor shroud and metallic volute, or it may be an all-ceramic turbine (volute, rotor, rotor shroud). Examples of such turbine designs are disclosed in U.S. patent application Ser. No. 13/180,275 entitled "Metallic Ceramic Spool for a Gas Turbine Engine" filed Jul. 11, 2011 which is incorporated herein by reference.

In either of the above designs, the ceramic rotor is attached to a shaft which, in turn, is attached to a compressor which is comprised of a metallic rotor because the compressor blades see considerably lower temperatures than the turbine blades. An improvement to the attachment of the ceramic rotor to a metallic shaft was disclosed in U.S. patent application Ser. No. 13/476,754 entitled "Ceramic-to-Metal Turbine Shaft Attachment" filed May 21, 2012 which is incorporated herein by reference. The ceramic-to-metal attachment joint, if not designed correctly, can limit the allowable operating temperature of the turbine rotor especially in small turbo-compressor spools such as used in turbo-chargers and microturbines. Most prior art joints are limited to operating temperatures below 800° K. An approach to achieving increased engine efficiency is pushing the rotor temperatures to levels approaching 1,400° K and higher.

In the case of an integral volute/shroud assembly made of a ceramic material, the means by which the ceramic volute/shroud assembly is attached to the metallic base plate can be important since there is considerable differential thermal expansion as the engine is operated from a cold start to maximum operating temperature (typically from ambient temperature to temperatures in the range of about 1,200° K to about 1,500° K). The base plate is typically fabricated from a high temperature steel alloy and provides the means of attachment of the turbine assembly to the outer steel case which houses the turbine assembly as illustrated in FIG. 2 of the present disclosure.

Current practice is to attach the ceramic volute/shroud assembly to the base plate by pins that can move within radial slots as illustrated in FIG. 5 of the present disclosure. The pins may be formed as part of the ceramic component and the slots may be machined into the steel baseplate. As can be appreciated, the pins may be part of the steel baseplate and the slots may be formed as part of the ceramic component. As the metallic ceramic parts heat up, the metallic baseplate will grow faster by thermal expansion than the ceramic volute/shroud assembly. The radial pin/slot attachment allows this differential growth to take place without mechanical interference of the pin in the slot. The relatively small diameters for the pin and slot form points of stress concentration, such stress concentrations being approximately proportional to the size of feature. Also, since the face of the ceramic volute/shroud assembly attachment is pressed against the matching face of the steel baseplate, the motion occurring during differential thermal growth or shrinkage causes significant friction between the mating surfaces and can lead to long term wear, distortion and damage.

In the present disclosure, a new means of attachment is disclosed which can substantially reduce the friction between the mating surfaces while still keeping the mating parts centered with respect to one another. The new approach is based on radial recessed faces wherein the radial faces slide relative to each other. There may be 3 or more recessed/raised segments which can maintain the alignment between the ceramic volute/shroud assembly and the steel baseplate while allowing differential growth of the parts. This approach can also provide a much larger bearing surface for the attachment than the radial pin/slot approach and substantially eliminates areas of stress concentration. It is thus a more robust design for components that undergo many thousands of thermal cycles.

In one embodiment, a gas turbine engine is disclosed, comprising a) at least one turbo-compressor spool assembly, wherein the at least one turbo-compressor spool assembly comprises a compressor in mechanical communication with a turbine, a ceramic volute directing an inlet gas towards an inlet of a ceramic rotor of the turbine and a ceramic shroud adjacent to the rotor of the turbine, the ceramic shroud directing an outlet gas towards an outlet of the at least one turbo-compressor spool assembly and b) a metallic housing comprising a metallic base plate having a metallic surface to engage a ceramic surface of at least one of the ceramic shroud and volute; wherein each of the engaged metallic and ceramic surfaces comprises at least one raised face and at least one recessed face, wherein, when the ceramic and metallic faces are engaged, the at least one raised face of the metallic surface opposes the at least one recessed face of the ceramic surface and the at least one recessed face of the metallic surface opposes the at least one raised face of the ceramic surface. In operation in a cool temperature state, a radial gap exists between an inner edge of the ceramic surface and an inner edge of the metallic base plate while in an intermediate temperature state, the radial gap is smaller than the radial gap in the cool temperature state and while in a high temperature state, the radial gap is smaller than the radial gap in the cool and intermediate temperature states.

In a second embodiment, a method is disclosed, comprising a) providing an engine comprising at least one turbo-compressor spool assembly, wherein the at least one turbo-compressor spool assembly comprises a compressor in mechanical communication with a turbine, a ceramic volute directing an inlet gas towards an inlet of a ceramic rotor of the turbine and a ceramic shroud adjacent to the rotor of the turbine, the ceramic shroud directing an outlet gas towards an outlet of the at least one turbo-compressor spool assembly and a metallic housing comprising a metallic base plate having a metallic surface to engage a ceramic surface of at least one of the ceramic shroud and volute, wherein each of the engaged metallic and ceramic surfaces comprises at least one raised face and at least one recessed face and b) maintaining, during engine operation, the at least one raised face of the metallic surface engaged with the at least one recessed face of the ceramic surface and the at least one recessed face of the metallic surface engaged with the at least one raised face of the ceramic surface to inhibit gas leakage at the engaged metallic and ceramic surfaces due to different coefficients of thermal expansion and contraction between the metallic and ceramic materials in the metallic housing and at least one of the ceramic shroud and volute, respectively. To better enable this method, the ceramic materials in the rotor and shroud preferably can have substantially similar thermal expansion characteristics and the ceramic materials in the shroud and volute preferably should each comprise a substantially identical ceramic composition.

The above-described embodiments and configurations are neither complete nor exhaustive. As will be appreciated, other embodiments of the disclosure are possible utilizing, alone or in combination, one or more of the features set forth above or described in detail below. These and other advantages will be apparent from the disclosure of the disclosure(s) contained herein.

The phrases at least one, one or more, and and/or are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The following definitions are used herein:

A bellows is a flexible or deformable, expandable and/or contractible, container or enclosure. A bellows is typically a container which is deformable in such a way as to alter its volume. A bellows can refer to a device for delivering pressurized air in a controlled quantity to a controlled location.

A ceramic is an inorganic, nonmetallic solid prepared by the action of heating and cooling. Ceramic materials may have a crystalline or partly crystalline structure, or may be amorphous (e.g., a glass). Examples are alumina, silicon carbide and silicon nitride.

An engine refers to any device that uses energy to develop mechanical power, such as motion in some other machine. Examples are diesel engines, gas turbine engines, microturbines, Stirling engines and spark ignition engines A prime power source refers to any device that uses energy to develop mechanical or electrical power, such as motion in some other machine. Examples are diesel engines, gas turbine engines, microturbines, Stirling engines, spark ignition engines and fuel cells.

The term means shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

A metallic material is a material containing a metal or a metallic compound. A metal refers commonly to alkali metals, alkaline-earth metals, radioactive and nonradioactive rare earth metals, transition metals, and other metals. Examples are aluminum, steel and titanium.

The no failure regime of a ceramic material, as used herein, refers to the region of a flexural strength versus temperature graph for ceramic materials wherein both the flexural stress and temperature are low enough that the ceramic material has a very low probability of failure and has a lifetime of a very large number of flexural and/or thermal cycles. Operation of the ceramic material in the no failure regime means that the combination of maximum flexural stress and maximum temperature do not approach a failure limit such as the Weibull strength variability regime, the fast fracture regime, the slow crack growth regime or the creep fracture regime as illustrated in FIG. 3. When the ceramic material approaches or enters any of these failure regimes, then the probability of failure is increased precipitously and the lifetime to failure of the component is reduced precipitously. This applies to ceramic components that are manufactured within their design specifications from ceramic materials that are also within their design specifications. Typically, the no-failure regime of the ceramics used herein exists at operating temperatures of no more than about 1,550° K, more typically of no more than about 1,500° K, and even more typically of no more than about 1,400° K. Common maximum flexural strengths for the no-failure regime of the ceramics used herein are about 250 MPa and more commonly about 175 MPa.

Power density as used herein is power per unit volume (watts per cubic meter).

A recuperator is a heat exchanger dedicated to returning exhaust heat energy from a process back into the process to increase process efficiency. In a gas turbine thermodynamic cycle, heat energy is transferred from the turbine discharge to the combustor inlet gas stream, thereby reducing heating required by fuel to achieve a requisite firing temperature.

A regenerator is a type of heat exchanger where the flow through the heat exchanger is cyclical and periodically changes direction. It is similar to a countercurrent heat exchanger. However, a regenerator mixes a portion of the two fluid flows while a countercurrent exchanger maintains them separated. The exhaust gas trapped in the regenerator is mixed with the trapped air later. It is the trapped gases that get mixed, not the flowing gases, unless there are leaks past the valves.

Specific power as used herein is power per unit mass (watts per kilogram).

A thermal oxidizer is a type of combustor comprised of a matrix material which is typically a ceramic and a large number of channels which are typically circular in cross section. When a fuel-air mixture is passed through the thermal oxidizer, it begins to react as it flows along the channels until it is fully reacted when it exits the thermal oxidizer. A thermal oxidizer is characterized by a smooth combustion process as the flow down the channels is effectively one-dimensional fully developed flow with a marked absence of hot spots.

A thermal reactor, as used herein, is another name for a thermal oxidizer.

A turbine is a rotary machine in which mechanical work is continuously extracted from a moving fluid by expanding the fluid from a higher pressure to a lower pressure. The simplest turbines have one moving part, a rotor assembly, which is a shaft or drum with blades attached. Moving fluid acts on the blades, or the blades react to the flow, so that they move and impart rotational energy to the rotor.

Turbine Inlet Temperature (TIT) as used herein refers to the gas temperature at the outlet of the combustor which is closely connected to the inlet of the high pressure turbine and these are generally taken to be the same temperature.

A turbo-compressor spool assembly as used herein refers to an assembly typically comprised of an outer case, a centrifugal compressor, a radial turbine wherein the centrifugal compressor and radial turbine are attached to a common shaft. The assembly also includes inlet ducting for the compressor, a compressor rotor, a diffuser for the compressor outlet, a volute for incoming flow to the turbine, a turbine rotor and an outlet diffuser for the turbine. The shaft connecting the compressor and turbine includes a bearing system.

A volute is a scroll transition duct which looks like a tuba or a snail shell. Volutes may be used to channel flow gases from one component of a gas turbine to the next. Gases flow through the helical body of the scroll and are redirected into the next component. A key advantage of the scroll is that the device inherently provides a constant flow angle at the inlet and outlet. To date, this type of transition duct has only been successfully used on very small engines or turbochargers where the geometrical fabrication issues are less involved.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure may take form in various components and arrangements of components, and in various steps and arrangements of steps. The drawings are only for purposes of illustrating the preferred embodiments and are not to be construed as limiting the disclosure. In the drawings, like reference numerals refer to like or analogous components throughout the several views.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Exemplary Gas Turbine Engine

An exemplary engine is a high efficiency gas turbine engine. It typically has lower NOx emissions, is more fuel flexible and has lower maintenance costs than comparable reciprocating engines. For example, an intercooled recuperated gas turbine engine in the range of about 10 kW to about 750 kW is available with thermal efficiencies above 40%. A schematic of an intercooled, recuperated gas turbine engine is shown in FIG. 1.

Figure 1:
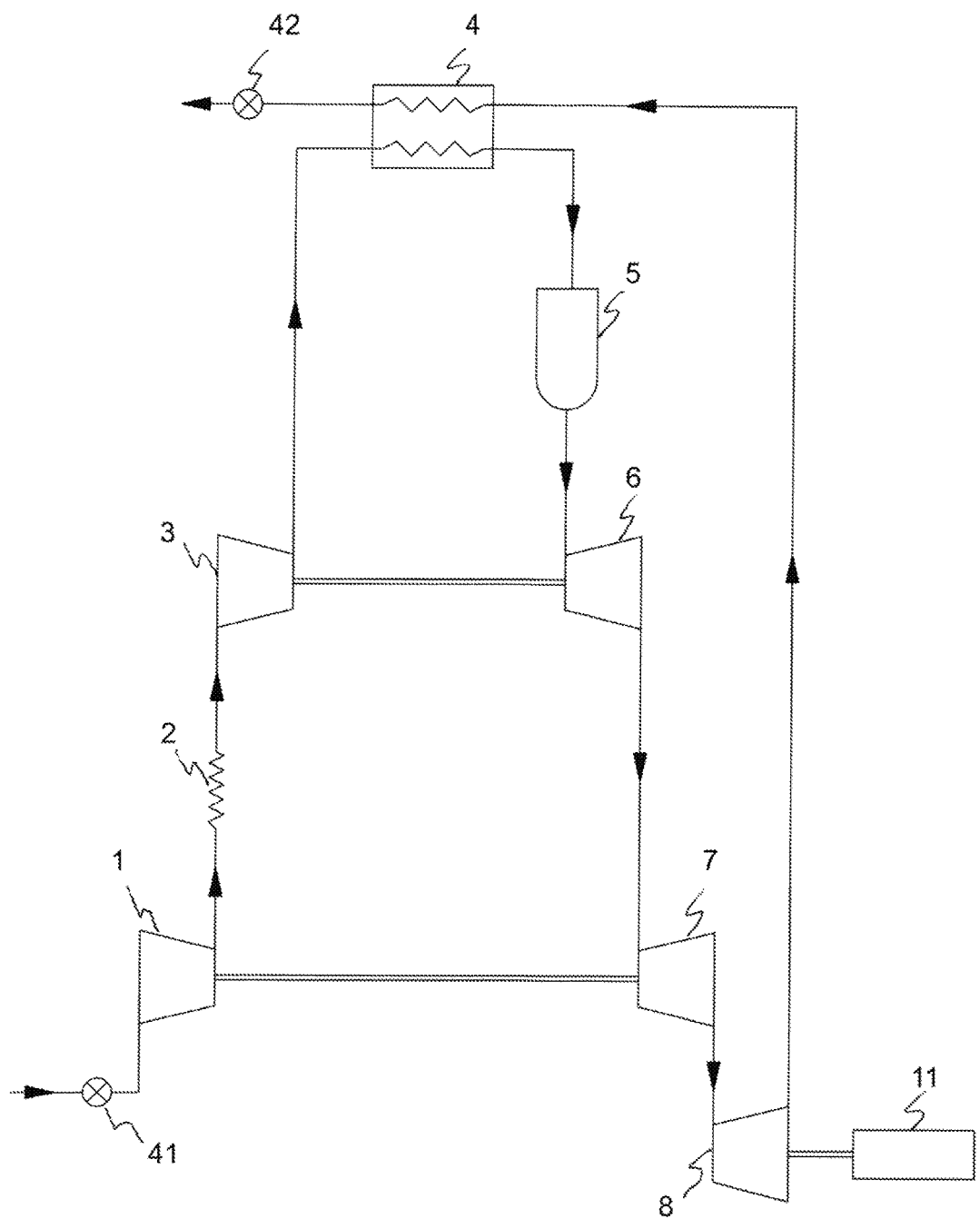
FIG. 1 is schematic of the component architecture of a multi-spool gas turbine engine.

FIG. 1 is prior art schematic of the component architecture of a multi-spool gas turbine engine. Gas is ingested into a low pressure compressor 1. The outlet of the low pressure compressor 1 passes through an intercooler 2 which removes a portion of heat from the gas stream at approximately constant pressure. The gas then enters a high pressure compressor 3. The outlet of high pressure compressor 3 passes through a recuperator 4 where some heat from the exhaust gas is transferred, at approximately constant pressure, to the gas flow from the high pressure compressor 3. The further heated gas from recuperator 4 is then directed to a combustor 5 where a fuel is burned, adding heat energy to the gas flow at approximately constant pressure. The gas emerging from the combustor 5 then enters a high pressure turbine 6 where work is done by the turbine to operate the high pressure compressor 3. The gas exiting from the high pressure turbine 6 then enters a low pressure turbine 7 where work is done by the turbine to operate the low pressure compressor 1. The gas exiting from the low pressure turbine 7 then enters a free power turbine 8. The shaft of the free power turbine, in turn, drives a transmission 11 which may be an electrical, mechanical or hybrid transmission for a vehicle. Alternately, the shaft of the free power turbine can drive an electrical generator or alternator. This engine design is described, for example, in U.S. patent application Ser. No. 12/115,134 entitled "Multi-Spool Intercooled Recuperated Gas Turbine" filed May 5, 2008 which is incorporated herein by reference.

As can be appreciated, the engine illustrated in FIG. 1 can have additional components (such as for example a re-heater between the high pressure and low pressure turbines) or can have fewer components (such as for example a single compressor-turbine spool, or no free power turbine but shaft power coming off the low pressure turbine spool). A more advanced engine design which comprises 3 or 4 spools, 2 two stages of intercooling and two stages of reheaters is disclosed in U.S. patent application Ser. No. 13/534,909 entitled "High Efficiency Compact Gas Turbine Engine" filed Jun. 27, 2012 which is incorporated herein by reference.

A gas turbine engine is an enabling engine for efficient multi-fuel use and, in particular, this engine can be configured to switch between fuels while the engine is running and the vehicle is in motion (on the fly). In addition, a gas turbine engine can be configured to switch on the fly between liquid and gaseous fuels or operate on combinations of these fuels. This is possible because combustion in a gas turbine engine is continuous (as opposed to episodic such as in a reciprocating piston engine) and the important fuel parameter is the specific energy content of the fuel (that is, energy per unit mass) not its cetane number or octane rating. The cetane number (typically for diesel fuels and compression ignition) or octane rating (typically for gasoline fuels and spark ignition) are important parameters in piston engines for specifying fuel ignition properties.

The gas turbine engine such as shown schematically in FIG. 1 enables a multi-fuel strategy. This engine is prior art although even more efficient multi-fuel configurations will require innovative modifications to components and sub-components. This is an example of a 375 kW engine that uses intercooling and recuperation to achieve high operating efficiencies (40% or more) over a substantial range of vehicle operating speeds. This compact engine is suitable for light to heavy trucks. Variations of this engine design are suitable for smaller vehicles as well as applications such as, for example, marine, rail, agricultural and power-generation. One of the principal features of this engine is its fuel flexibility and fuel tolerance. This engine can operate on any number of liquid fuels (gasoline, diesel, ethanol, methanol, butanol, alcohol, bio diesel and the like) and on any number of gaseous fuels (compressed or liquid natural gas, propane, hydrogen and the like). This engine may also be operated on a combination of fuels such as mixtures of gasoline and diesel or mixtures of diesel and natural gas. Switching between these fuels is generally a matter of switching fuel injection systems and/or fuel mixtures.

This engine operates on the Brayton cycle and, because combustion is continuous, the peak operating temperatures are substantially lower than comparably sized piston engines operating on either an Otto cycle or Diesel cycle. This lower peak operating temperature results in substantially less NOx emissions. This engine has a relatively flat efficiency curve over wide operating range (from about 20% of full power to about 85% of full power. It also has a multi-fuel capability with the ability to change fuels on the fly as described in U.S. patent application Ser. No. 13/090,104 entitled "Multi-Fuel Vehicle Strategy" filed Apr. 19, 2011 which is incorporated herein by reference.

Previously Disclosed Metallic and Ceramic Gas Turbine Components

Figure 2:
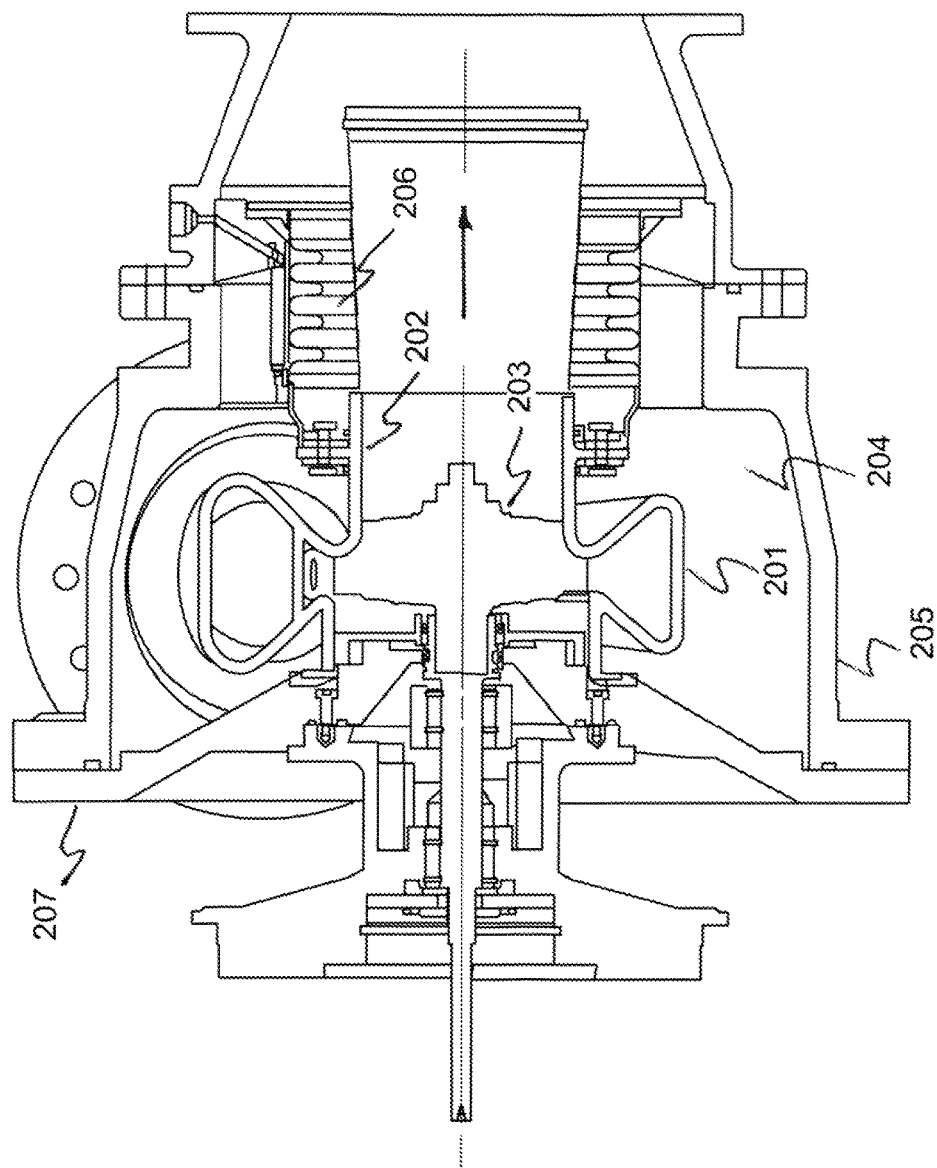
FIG. 2 is a schematic of a gas turbine compressor/turbine spool assembly comprising a ceramic rotor, volute and shroud.

FIG. 2 is schematic of a gas turbine compressor/turbine spool assembly with ceramic and metallic components. The assembly shown comprises a centrifugal compressor and a radial turbine. A ceramic turbine rotor 203 is shown separated by a small clearance gap from a ceramic shroud 202 which is integral with a ceramic volute 201. The volute, shroud and rotor are housed inside a metal case 204. The volute, shroud and rotor assembly are attached to metallic base plate 207 which secures the turbine assembly within housing 205. The ceramic shroud 202 is also attached to a compliant metallic bellows 206 which is attached to an outer metal case 205. For example the ceramic rotor 203 can be fabricated from silicon nitride (thermal conductivity about 27 W/m/° K and coefficient thermal expansion of about 3.14 μm/m/K) and is capable of operating safely at turbine inlet temperatures in the approximate range commonly of from about 850° K to about 1,800° K, more commonly of from about 250° K to about 1,650° K and even more commonly of about 1,400° K. Ceramic shroud 202 and volute 201 can be fabricated from silicon carbide (thermal conductivity about 41 W/m/° K and coefficient thermal expansion of about 5.12 μm/m/K), for example, which has a coefficient of thermal conductivity and thermal expansion similar to that of silicon nitride used for rotor 203.

In this embodiment, when the assembly is heated during engine operation, the ceramic rotor 203 and ceramic shroud 202 have approximately the same coefficient of thermal expansion and so they expand radially approximately by the same amount thus retaining the approximate initial radial clearance between rotor 203 and shroud 202. The right side of ceramic volute 201 expands at approximately the same rate as ceramic shroud 202 and tends to push shroud 202 to the right but only by a small amount. As the assembly is heated, case 205 and bellows 206 have coefficients of thermal expansion typical of metals. Case 205 and compliant metallic bellows 206 also expand away from metallic base plate 207 but the compliance of the bellows does not allow the case 205 to pull shroud 202 away from metallic base plate 207. The expansion of the ceramic volute 201 is relatively small and does not cause the axial clearance gap between rotor and shroud to increase beyond that which is desired.

The use of a rotor and volute/shroud fabricated from the same or similar ceramics adequately thus controls radial and axial shroud clearances between the rotor 203 and shroud 202 and maintains high rotor efficiency by controlling the clearance and minimizing parasitic flow leakages between the rotor blade tips and the shroud.

The advantages of this design approach can include:
similar coefficient of thermal expansion of ceramic volute/shroud and rotor gives excellent shroud clearance control
maintains good form stability—will keep its shape at high temperatures
has good thermal shock properties
allows complicated shapes can be easily cast
is cost effective compared to high temperature turbine metals The temperature of the flow exiting the combustor into the volute that directs the flow to the high pressure turbine may be substantially in the same range as the turbine inlet temperature. The temperature of the flow exiting the high pressure turbine into the shroud that directs the flow towards the low pressure turbine may be in the range of from about 1,000° K to about 1,400° K, more commonly from about 1,000° K to about 1,300° K, and even more commonly of approximately 1,200° K. Stated differently, the inlet temperature of the high pressure turbine is commonly higher than, more commonly about 5% higher than, more commonly about 10% higher than, more commonly about 15% higher than, and even more commonly about 20% higher than the high pressure turbine gas outlet temperature. A one-piece volute and shroud may be exposed to a temperature differential in the range of about 100° K to about 300° K and more commonly about 160° K to about 200° K.

This configuration is capable of operating safely at turbine inlet temperatures in the approximate range from about 850° K to about 1,400° K. The ceramic rotor may be fabricated from rotor fabricated from silicon nitride. The ceramic shroud and volute can be fabricated from silicon carbide. The use of a rotor and volute/shroud fabricated from the same or similar ceramics adequately thus controls radial and axial shroud clearances between the rotor 203 and shroud 202 and maintains high rotor efficiency by controlling the clearance and minimizing parasitic flow leakages between the rotor blade tips and the shroud. This design of a single piece ceramic volute and shroud for use with a ceramic turbine rotor is preferred if the ceramic material used can be operated well within the no-failure region of the ceramic. A flexure stress-temperature map illustrating failure regimes for typical ceramic materials is discussed in previously referenced U.S. patent application Ser. No. 13/180,275 and U.S. patent application Ser. No. 13/476,754. A flexure stress-temperature map shows that when flexure stress and temperature experienced by a ceramic component are high, the component operates in the fast-fracture regime and the ceramic component lifetime would be expected to be unpredictable and typically short. This graphic also shows that when flexure stress and temperature experienced by a ceramic component are low, then the component operates in the no-failure regime and the ceramic component lifetime would be expected to be predictable and typically long. When the flexure stress is high but the temperature is low, then the component operates in a regime characterized by Weibull strength variability and the ceramic component lifetime would be expected to be somewhat unpredictable and variable. When the flexure stress is low but the temperature is high, then the component operates in a regime characterized by slow crack growth or creep and the ceramic component lifetime would be expected to be somewhat unpredictable and variable.

The disadvantages of the design approach illustrated in FIG. 2 can include:
the amount of stress that can be sustained at high temperature in the volute is unpredictable especially if the materials operate in the slow crack growth or fast fracture regions of the flexure stress-temperature map
the potential for catastrophic failure of the volute is significant since ceramics generally don't yield, they behave elastically until they fracture and break abruptly This design of a single piece or two piece ceramic volute and shroud for use with a ceramic turbine rotor is preferred if the ceramic material used can be operated well within the no-failure region discussed above.

Figure 3:
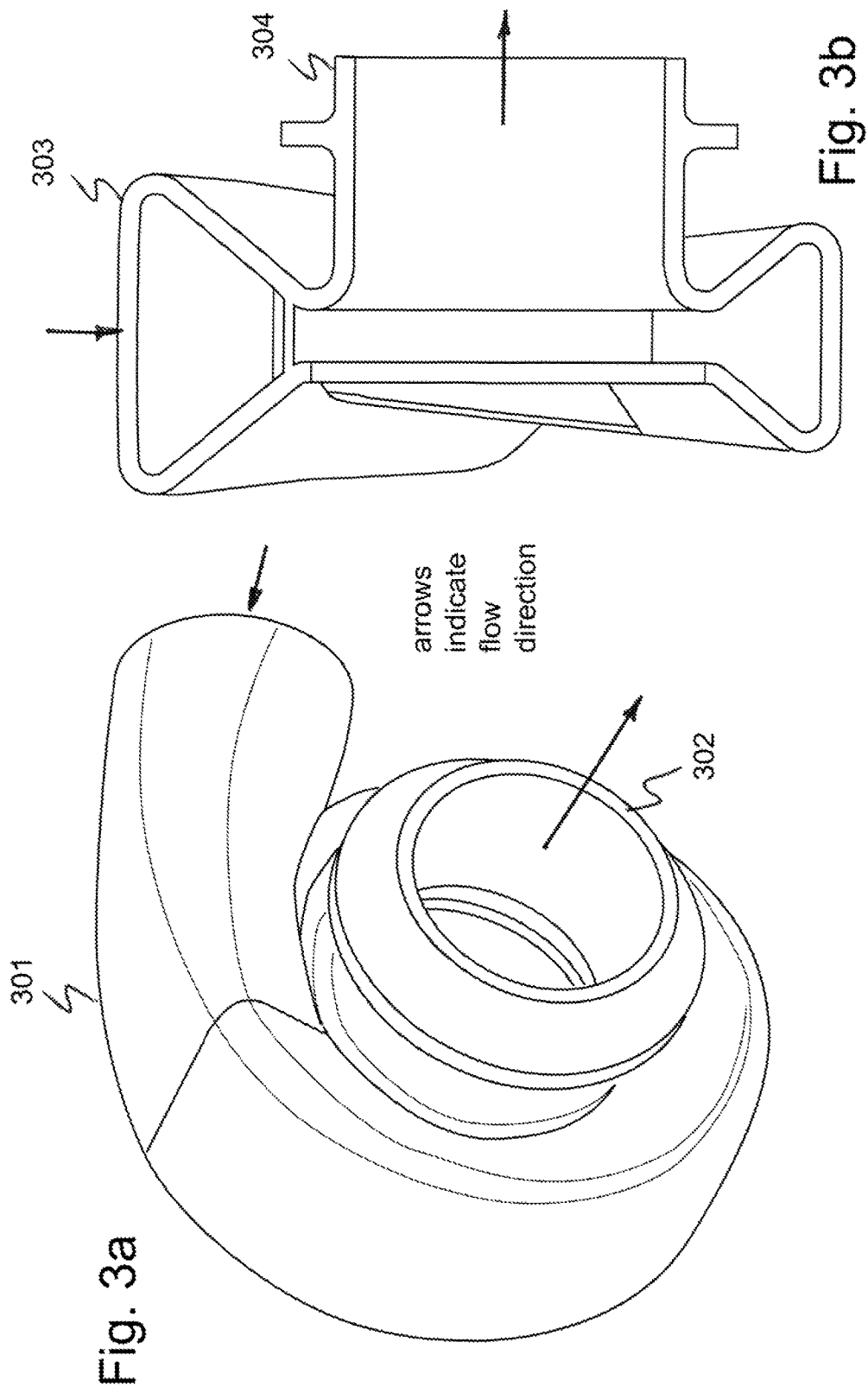
FIGS. 3a-b are a schematic of an integral ceramic volute and shroud.

FIG. 3 is a schematic of an integral ceramic volute and shroud such as also shown in FIG. 2. FIG. 3a is an isometric view showing the volute 301 and the shroud 302. The volute/shroud can be made in one piece or multiple pieces. A typical material for such a volute/shroud is silicon carbide. FIG. 3b shows a side cutaway view again illustrating the volute 303 and the shroud 304. Arrows indicate flow direction.

Figure 4:
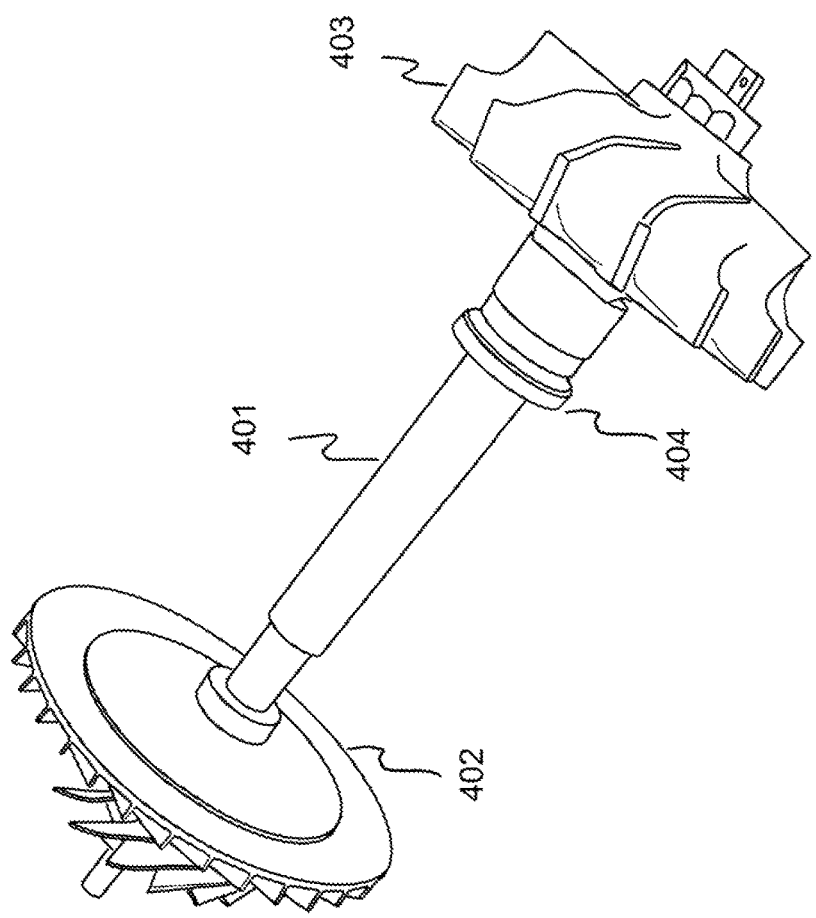
FIG. 4 is a schematic of a turbo-compressor spool showing a metallic compressor rotor and a ceramic turbine rotor.

FIG. 4 is a schematic of a prior art turbo-compressor spool showing a metallic compressor rotor and a ceramic turbine rotor. This figure illustrates a compressor/turbine spool typical of use in a high-efficiency gas turbine operating in the output power range as high as about 300 to about 750 kW. A metallic compressor rotor 402 and a ceramic turbine rotor 403 are shown attached to the opposite ends of a metal shaft 401. The ceramic rotor shown here is a 95-mm diameter rotor fabricated from silicon nitride and was originally designed for use in turbocharger applications. As can be seen, the joint 404 between the ceramic rotor and metallic shaft is close to the ceramic rotor and is therefore exposed to high temperatures of the combustion products passing through the turbine. As can be seen, the joint 404 between the ceramic rotor and metallic shaft is close to the ceramic rotor and would typically be between the leftmost oil bearing and the ceramic rotor. The joint 404 is formed by inserting the ceramic shaft stub into a counterbore in the metallic shaft. The joint 404 is about 20 to about 25 mm from the ceramic rotor and is therefore exposed to high temperatures of the gas products passing through the turbine. Typical turbine inlet temperatures for this design are in the range of about 1,250° K to about 1,400° K.

The ceramic-to-metal attachment joint, limits the allowable operating temperature of the turbine rotor. Most joints of this type are limited to operating temperatures below 800° K. The drive for increased efficiency is pushing the rotor temperatures to levels approaching 1,400° K and higher. In the prior art, this ceramic-to-metal attachment is typically located close to the turbine rotor as shown in FIG. 4 for example. In this design, aggressive cooling is required to maintain the allowable temperature. The steep thermal gradient creates an area of elevated thermal stress. As disclosed in the previously referenced U.S. patent application Ser. No. 13/476,754, moving the temperature-limited joint closer to the center of the shaft between the bearings, lowers its temperature and reduces the sharp gradient (and associated thermal stress) which naturally occurs between the turbine rotor and the cooler joint. A large outside diameter bearing is required on the turbine side so that it can be assembled. It is also anticipated that the ceramic turbine stub shaft needs to be relatively large in diameter relative to the metallic portion of the shaft to have the proper stiffness.

Thermal Expansion of Metallic and Ceramic Materials

The coefficient of linear thermal expansion in μm/m/K for some typical metallic and ceramic materials used in turbine components and assemblies such as shown in FIG. 2 are:

Metallic—Hastelloy X and Inconel Alloy 718 have a linear thermal expansion coefficient of about 13 to 16 μm/m/K over the temperature range of about 300K to about 1,350 K;

Ceramic—Silicon carbide has a linear thermal expansion coefficient of about 5 μm/m/K over the temperature range of about 300K to about 1,350 K; and Ceramic—silicon nitride has a linear thermal expansion coefficient of about 3 μm/m/K over the temperature range of about 300K to about 1,350 K.

For all materials, the coefficient of area thermal expansion is approximately the square of the coefficient of linear thermal expansion and the coefficient of volume thermal expansion is approximately the cube of the coefficient of linear thermal expansion.

Prior Method of Attachment

Figure 5:
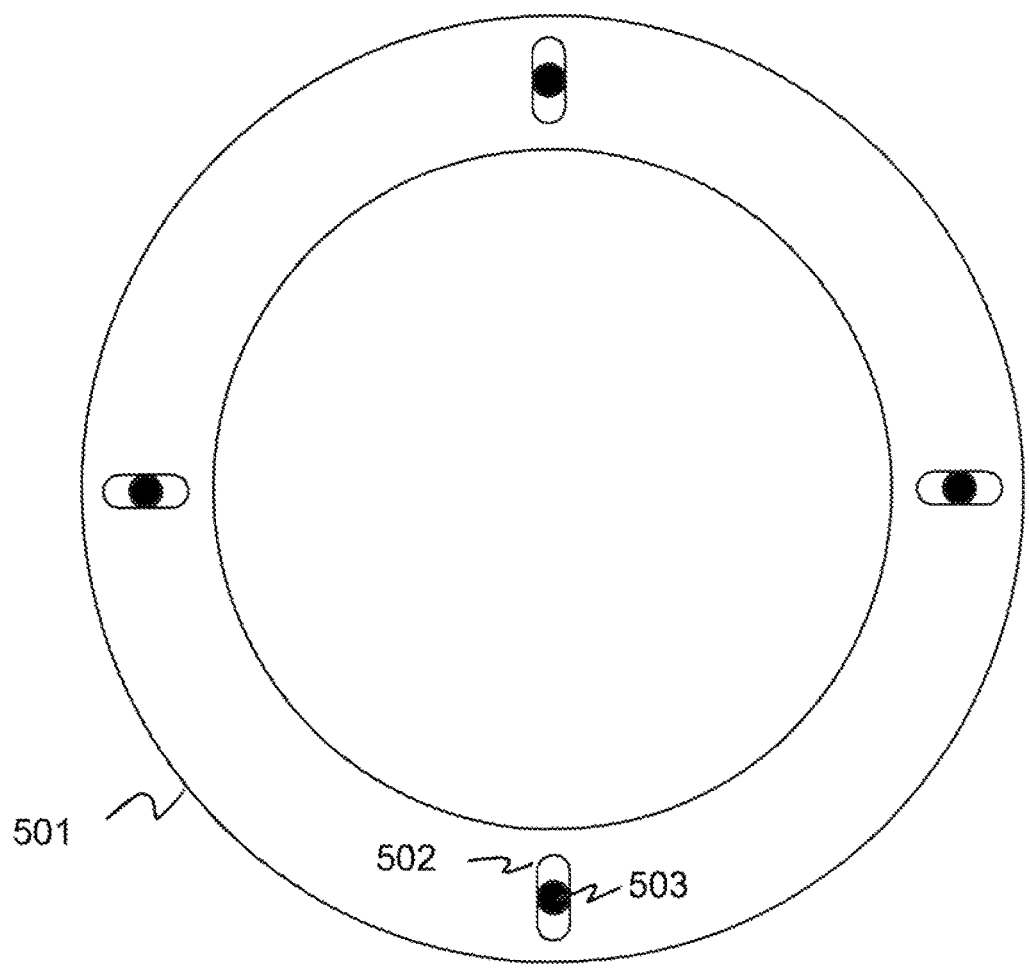
FIG. 5 is a prior method of attaching an integral ceramic volute and shroud to a metallic base plate.

FIG. 5 is a prior method of attaching an integral ceramic volute and shroud to a metallic base plate. The slotted ring 501 can be part of the ceramic volute/shroud assembly and the pins 503 can be part of the metallic base plate. In this case, the slotted ring 501 grows more slowly when heated than the metallic base and the metallic pins 503 move radially outward relative to the slots 502. Alternately, the slots 502 can be machined into the metallic base plate and the pins formed as part of the ceramic volute/shroud. In this case the slotted ring 501 grows more rapidly when heated than the ceramic volute/shroud and the ceramic pins 503 move radially inward relative to the slots 502. These relative motions are reversed during cooling. If the parts are heated uniformly, the pins may move freely within the slots along a radial line. If the parts are not heated uniformly, the pins may bind on the sides of the slots, stressing the pins where they are attached.

Since the ceramic volute/shroud assembly is pressed against the metallic base plate by a compliant bellows (see item 206 in FIG. 2), there is substantial friction between the mating surfaces of the ceramic volute/shroud assembly and metallic base plate. This can lead to wear between the mating surfaces and to uneven motion which can further stress the pins.

Present Disclosure

Figure 6:
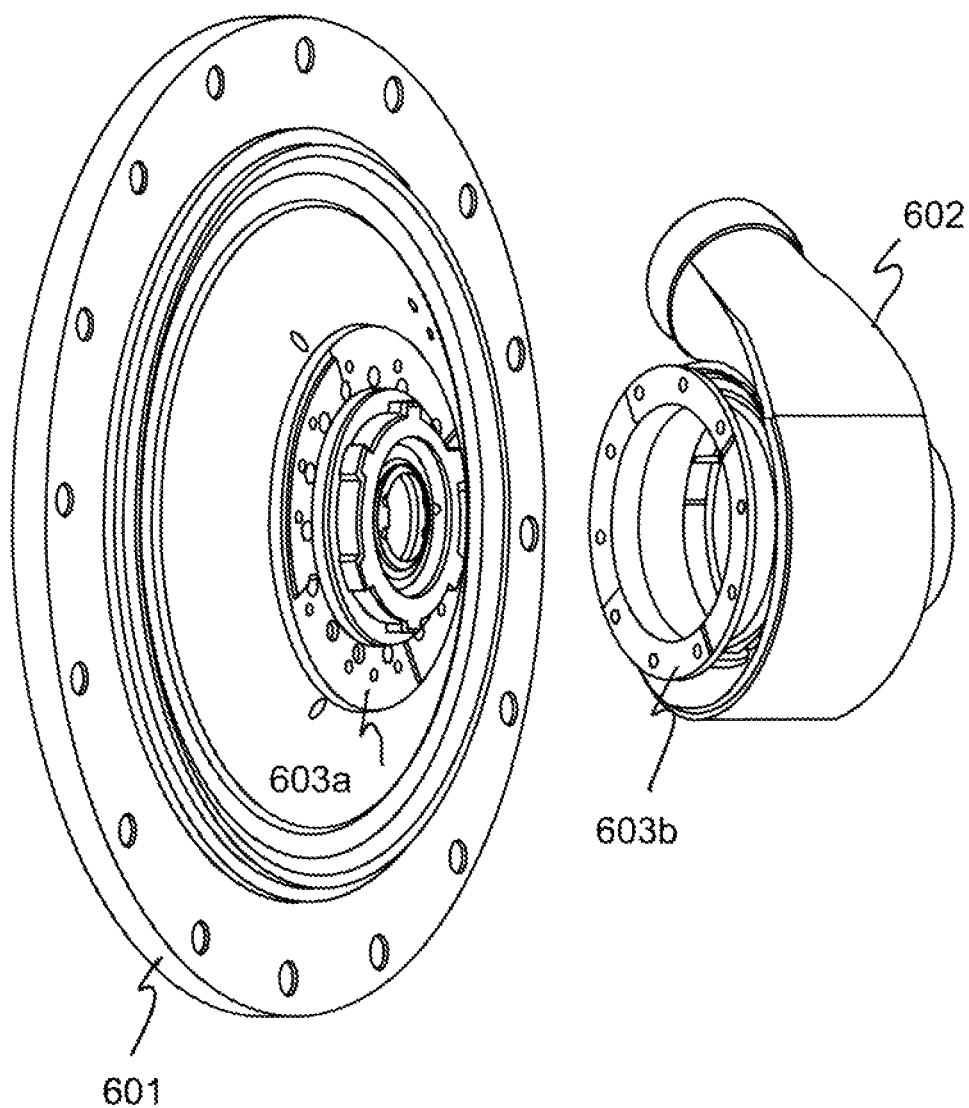
FIG. 6 is a new method of attaching an integral ceramic volute and shroud to a metallic base plate.

FIG. 6 is a new method of attaching an integral ceramic volute and shroud to a metallic base plate. In this example, the mating surface of the ceramic volute/shroud 602 is comprised of four surfaces where two of the opposite facing surfaces are recessed relative to the other two surfaces. The mating face of the metallic base plate 601 is also comprised of four surfaces (or faces) where two of the opposite facing surfaces (or faces) on each of the metallic base plate and mating surface of the ceramic volute/shroud 602 are recessed relative to the other two surfaces (or faces), so that when the parts are mated, the recessed surfaces (or faces) of the ceramic volute/shroud fit between the raised surfaces (or faces) of the metallic base plate as indicated by items 603a and 603b and the raised surfaces (or faces) of the mating surface of the ceramic volute/shroud fit between the recessed surfaces (or faces) of the metallic base plate. Stated differently, each of the raised surfaces (or faces) of the mating surface of the ceramic volute/shroud engages a corresponding recessed surface (or face) of the metallic base plate, and each of the recessed surfaces (or faces) of the mating surface of the ceramic volute/shroud engages a corresponding raised surface (or face) of the metallic based plate. The edges of all the surfaces are along radial lines of the two circular parts so that when differential thermal growth or shrinkage occurs, the mating sides of each surface will move parallel to each other.

This design creates a much more robust centering alignment between the two parts than the pin and slot design of FIG. 5. Turbines generally only see radial gradients which are accommodated by the design of the present disclosure. The radial faces work less well with asymmetric or circumferential gradients. If the parts are heated uniformly, the raised surfaces may move freely within opposing recessed surfaces along radial lines. If the parts are not heated uniformly, then the raised surfaces may bind on the opposite recessed surfaces but the forces are spread over a much larger surface area than in the pin and slot design of FIG. 5.

Since the ceramic volute/shroud assembly is pressed against the metallic base plate by a compliant bellows (see item 206 in FIG. 2), there is substantial friction between the mating surfaces of the ceramic volute/shroud assembly and metallic base plate. This can lead to wear between the mating surfaces and to uneven motion which will cause binding between the surfaces but the forces are spread over a much larger surface area than in the pin and slot design of FIG. 5 and therefore should result in longer part lifetimes.

Figure 7:
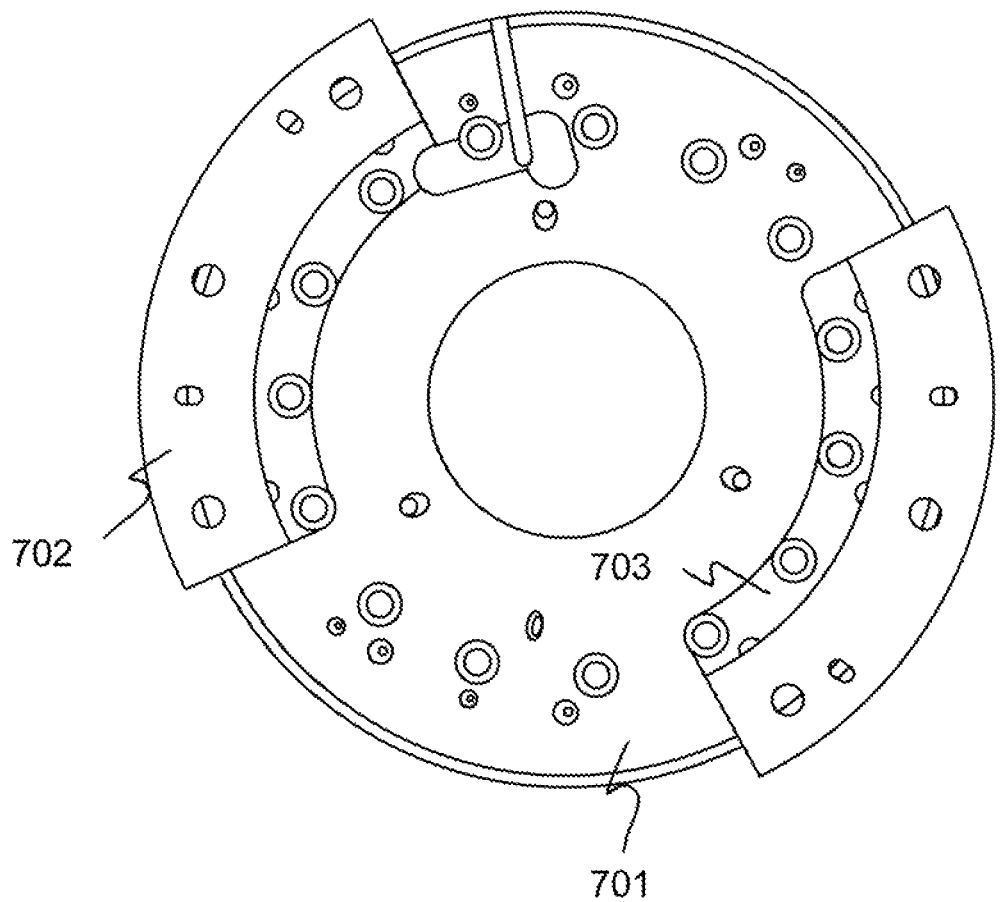
FIG. 7 is an illustration of a ceramic shroud segment relative to a metallic base plate in a cool temperature state.

FIG. 7 is a schematic example of a ceramic shroud segment relative to a metallic base plate in a cool temperature state. In a cool state (such as for example ambient conditions), the surfaces 702 of the ceramic volute/shroud are spaced radially out from the center hub of the metallic base plate 701 as indicated by gap 703.

Figure 8:
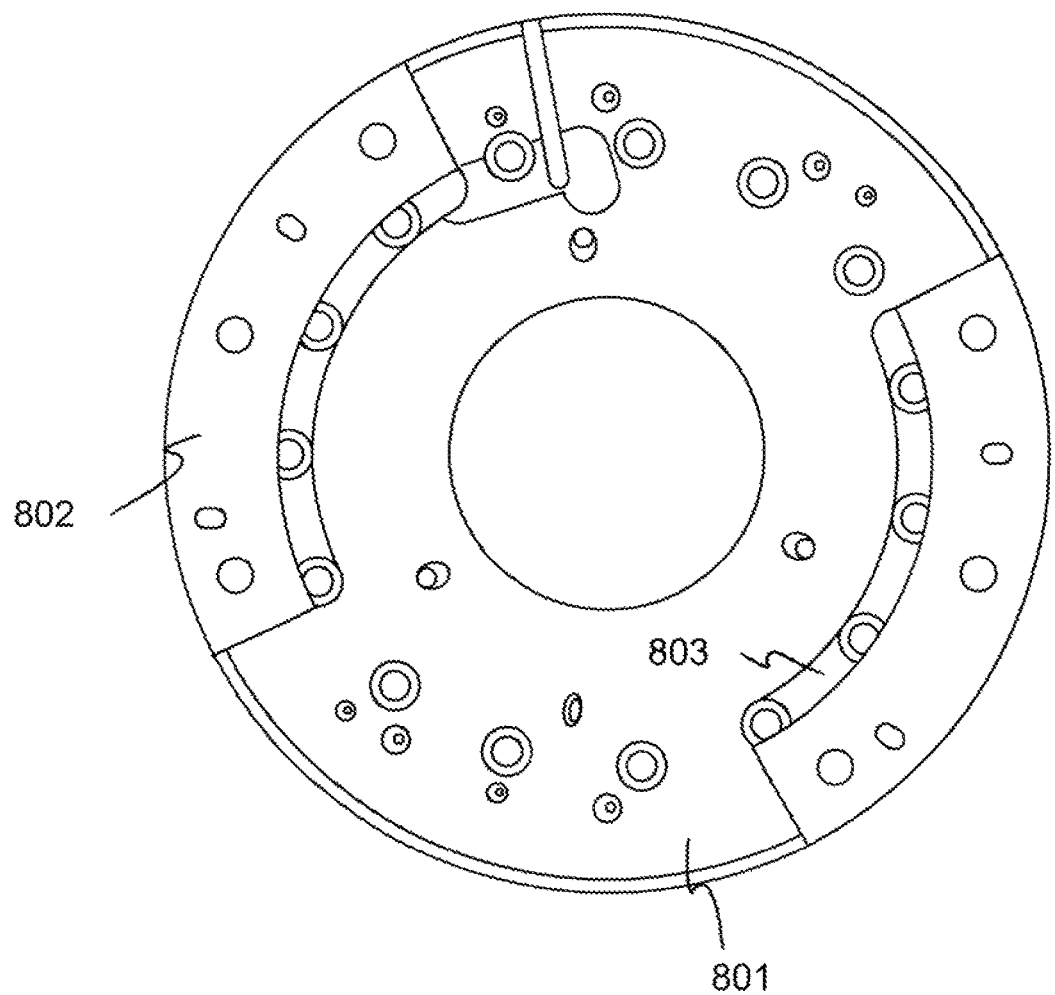
FIG. 8 is an illustration of a ceramic shroud segment relative to a metallic base plate in an intermediate temperature state.

FIG. 8 is a schematic example of a ceramic shroud segment relative to a metallic base plate in an intermediate temperature state. In an intermediate temperature state (such as for example when both parts are heated to 700° K), the surfaces 802 of the ceramic volute/shroud are spaced radially out from the center hub of the metallic base plate 801 as indicated by gap 803 which is about half the width of gap 703 in FIG. 7.

Figure 9:
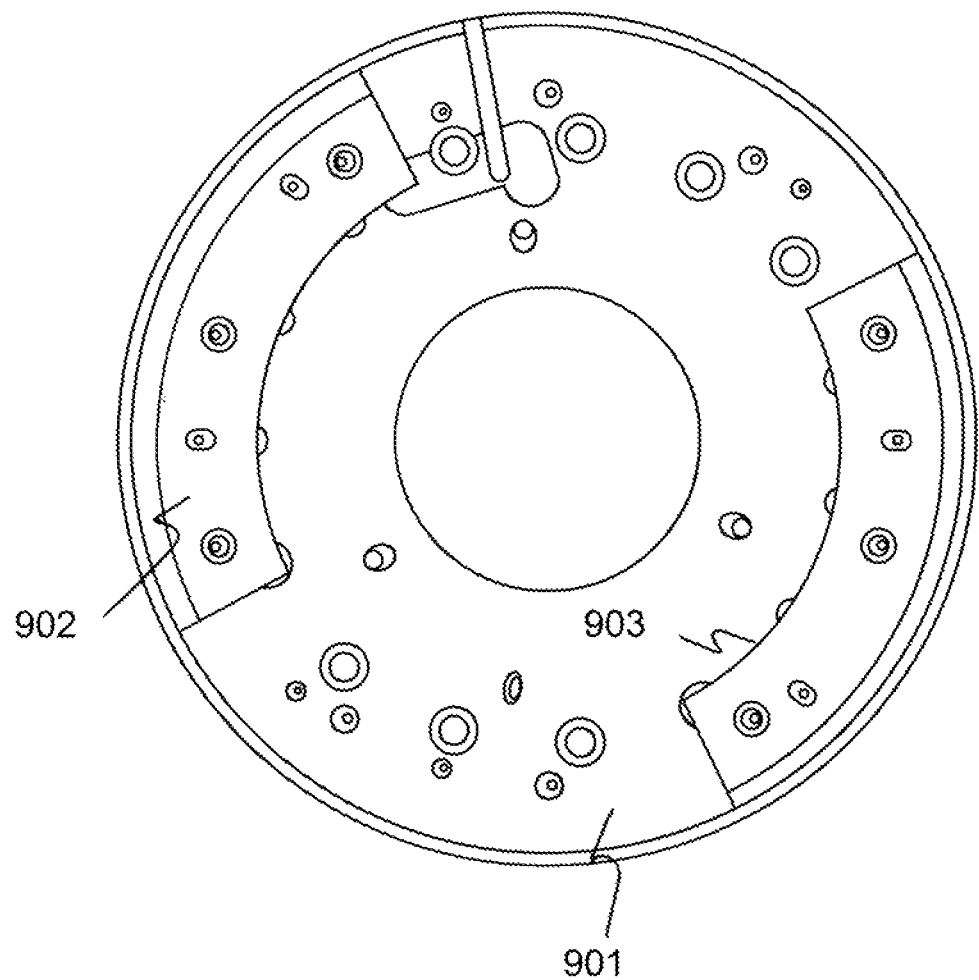
FIG. 9 is an illustration of a ceramic shroud segment relative to a metallic base plate in a high temperature state.

FIG. 9 is a schematic example of a ceramic shroud segment relative to a metallic base plate in a high temperature state. In a maximum allowable temperature state (such as for example when both parts are heated to 1,400° K), the surfaces 902 of the ceramic volute/shroud are essentially shown in contact or almost in contact with the center hub of the metallic base plate 1601 as indicated by the lack of a clearance gap 903 or gap 903 which can be a selected minimum allowable clearance gap.

Figure 10A:
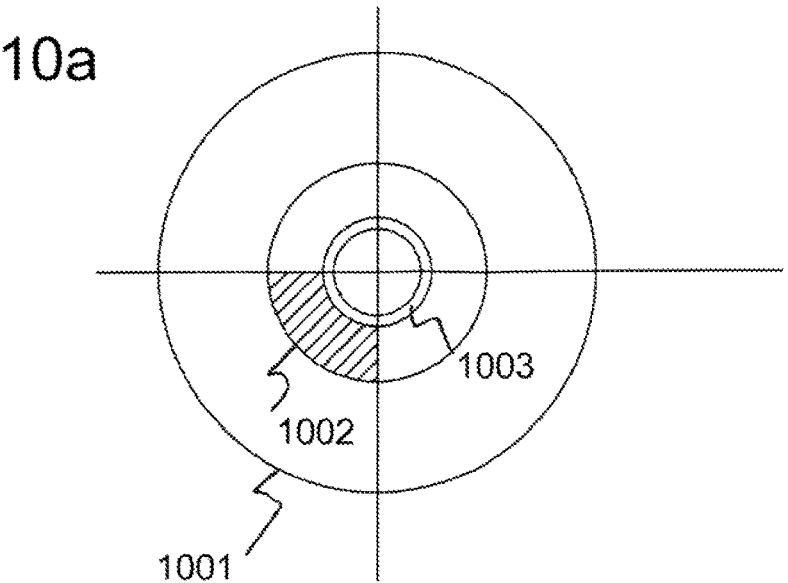
FIGS. 10a-b are a schematic of a four segment ceramic shroud relative to a metallic base plate.
Figure 10B:
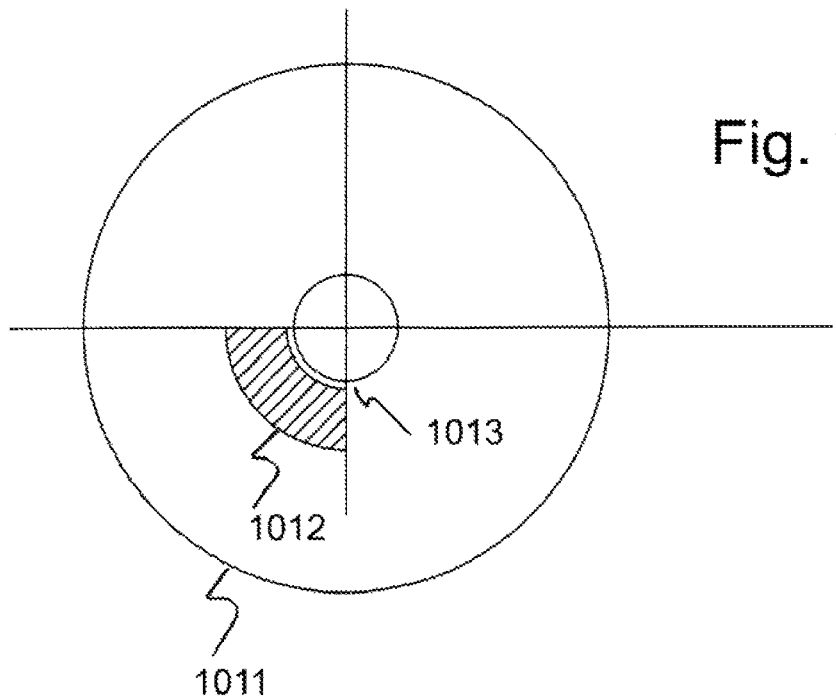

FIG. 10 is a schematic of a four surface (each part has 2 recessed and 2 raised surfaces) ceramic shroud relative to a metallic base plate. In FIG. 10a, the ceramic volute/shroud surface 1002 is spaced radially out from the center hub of the metallic base plate 1001 parts by a gap 1003 when the parts are in a cool temperature state. In FIG. 10b, the metallic base plate 1011 has grown by thermal expansion by about 20% while the ceramic surface 1012 has grown by thermal expansion by about 10%, thus closing gap 1013 between the ceramic volute/shroud surface 1012 and the center hub of the metallic base plate 1011.

Figure 11A:
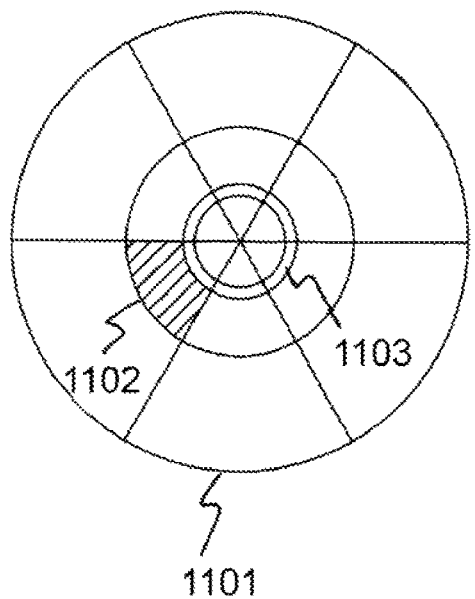
FIGS. 11a-b are a schematic of a six segment ceramic shroud relative to a metallic base plate.
Figure 11B:
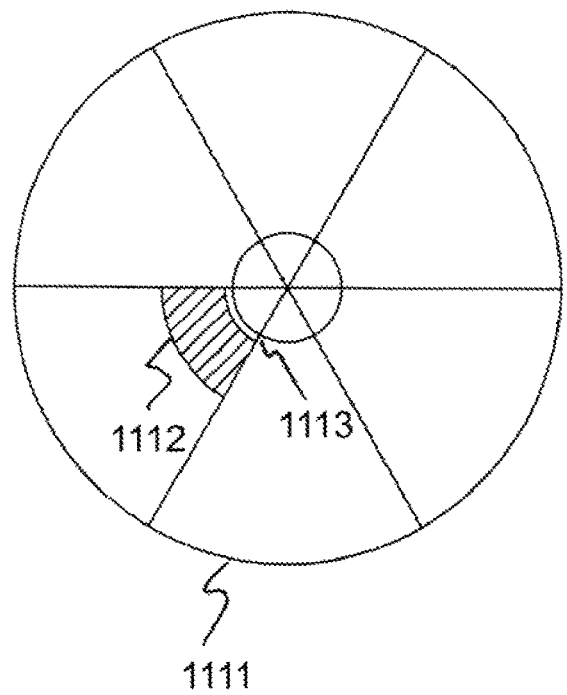

FIG. 11 is a schematic of a six surface (each part has 3 recessed and 3 raised surfaces) ceramic shroud relative to a metallic base plate. As can be appreciated, the number of mating surfaces (or faces) on each of the mating surface of the volute/shroud and metallic base plate are the same. Typically, the number of mating faces on each of the volute/shroud and metallic base plate is one of three, four, five, six, eight or ten. The principles of relative thermal motion remain the same for any number of surfaces. In FIG. 11a, the ceramic volute/shroud surface 1102 is spaced radially out from the center hub of the metallic base plate 1101 parts by a gap 1103 when the parts are in a cool temperature state. In FIG. 11b, the metallic base plate 1111 has grown by thermal expansion by about 20% while the ceramic surface 1112 has grown by thermal expansion by about 10%, thus closing gap 1113 between the ceramic volute/shroud surface 1112 and the center hub of the metallic base plate 1111. This illustrates that a six surface design functions the same as a four surface design.

The disclosures presented herein may be used on gas turbine engines used in vehicles or in gas turbine engines used in stationary applications such as, for example, power generation and gas compression.

The exemplary systems and methods of this disclosure have been described in relation to preferred aspects, embodiments, and configurations. Modifications and alterations will occur to others upon a reading and understanding of the preceding detailed description. It is intended that the disclosure be construed as including all such modifications and alterations insofar as they come within the scope of the appended claims or the equivalents thereof. To avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

The disclosure has been described with reference to the preferred embodiments. Modifications and alterations will occur to others upon a reading and understanding of the preceding detailed description. It is intended that the disclosure be construed as including all such modifications and alterations insofar as they come within the scope of the appended claims or the equivalents thereof.

A number of variations and modifications of the disclosures can be used. As will be appreciated, it would be possible to provide for some features of the disclosures without providing others. For example, the means of attachment which is based on radial recessed faces wherein the radial faces slide relative to each other and which substantially reduces the friction between the mating surfaces while still keeping the mating parts centered with respect to one another can be applied to any mating parts which have substantially different coefficients of thermal expansion. While this means of attachment is illustrated for a ceramic component mated to a metallic component, this approach could also be used for metallic components such as for example, titanium and steel as well as other combinations of materials such as carbon fiber components mating with metallic components; carbon fiber components mating with ceramic components, and the like.

The present disclosure, in various embodiments, includes components, methods, processes, systems and/or apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover though the description of the disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
providing an engine comprising at least one turbo-compressor spool assembly, wherein the at least one turbo-compressor spool assembly comprises a compressor in mechanical communication with a turbine, a ceramic volute directing an inlet gas towards an inlet of a ceramic rotor of the turbine and a ceramic shroud adjacent to the rotor of the turbine, the ceramic shroud directing an outlet gas towards an outlet of the at least one turbo-compressor spool assembly and a metallic housing comprising a metallic base plate having a metallic mating surface to engage a ceramic mating surface of at least one of the ceramic shroud and volute, wherein the metallic and ceramic mating surfaces are perpendicular to an axis of rotation of the rotor, wherein the metallic mating surface has a first coefficient of linear thermal expansion and contraction, wherein the ceramic mating surface has a second coefficient of linear thermal expansion and contraction, wherein the first and second coefficients of thermal expansion and contraction are different by at least a factor of two, wherein the metallic mating surface comprises at least one raised face raised parallel to the axis of rotation of the rotor and at least one recessed face recessed parallel to the axis of rotation of the rotor, and wherein the ceramic mating surface comprises at least one raised face raised parallel to the axis of rotation of the rotor and at least one recessed face recessed parallel to the axis of rotation of the rotor; and
maintaining, during engine operation, the at least one raised face of the metallic mating surface engaged with the at least one recessed face of the ceramic mating surface and the at least one recessed face of the metallic mating surface engaged with the at least one raised face of the ceramic mating surface to inhibit at least one of binding and wear at the engaged metallic and ceramic mating surfaces due to the difference between the first and second coefficients of thermal expansion and contraction between the metallic and ceramic materials in the metallic housing and at least one of the ceramic shroud and volute, respectively.

2. The method of claim 1, wherein the ceramic volute interfaces with the ceramic shroud and wherein an inlet gas to the turbine is heated by a fuel combustor, wherein the inlet gas has a temperature of from about 850° K to about 1,800° K, and the outlet gas has a temperature less than the inlet gas, the outlet gas temperature ranging from about 1,000° K to about 1,400° K, whereby the shroud is subjected to a temperature differential ranging from about 150° K to about 400° K.

3. The method of claim 2, wherein the ceramic materials in the rotor and shroud have substantially similar thermal expansion characteristics.

4. The method of claim 3, wherein the ceramic materials in the shroud and volute each comprise a substantially identical ceramic composition.

5. The method of claim 1, wherein:
in a cool temperature state, a radial gap exists between an inner edge of the ceramic mating surface and an inner edge of the metallic base plate;
in an intermediate temperature state, the radial gap is smaller than the radial gap in the cool temperature state; and
in a high temperature state, the radial gap is smaller than the radial gap in the cool and intermediate temperature states.

6. The method of claim 1, wherein the at least one raised face of the metallic mating surface comprises first and second raised faces and the at least one recessed face of the metallic mating surface comprises first and second recessed faces, wherein each of the first and second raised faces is positioned between the first and second recessed faces, and wherein the first and second raised faces are opposite facing and the first and second recessed faces are opposite facing.

7. The method of claim 6, wherein the at least one raised face of the ceramic surface comprises third and fourth raised faces and the at least one recessed face of the ceramic surface comprises third and fourth recessed faces, wherein each of the third and fourth raised faces is positioned between the third and fourth recessed faces, and wherein the third and fourth raised faces are opposite facing and the third and fourth recessed faces are opposite facing.

8. The method of claim 7, wherein the first raised face engages the third recessed face, wherein the second raised face engages the fourth recessed face, wherein the first recessed face engages the third raised face, and wherein the second recessed face engages the fourth raised face.

9. The method of claim 1, wherein the at least one turbo-compressor spool assembly comprises a plurality of turbo-compressor spool assemblies, each turbo-compressor spool assembly comprising a compressor and a turbine attached by a common shaft and a first of the turbo-compressor spool assemblies is in fluid communication with a second of the turbo-compressor spool assemblies, at least one of the common shafts of a selected turbo-compressor spool assembly comprising a metallic compressor rotor and a ceramic turbine rotor connected by a metallic-to-ceramic attachment joint and a first bearing being positioned adjacent to the metallic compressor rotor and a second bearing adjacent to the ceramic turbine rotor and the engine further comprising;
a free power turbine driven by a gas flow output by at least one of the turbo-compressor assemblies; and
a combustor operable to combust a fuel and a gas output by one of the plurality of turbo-compressor spool assemblies.

\* \* \* \* \*